United States Patent [19]
Causton et al.

[11] Patent Number: 6,083,618
[45] Date of Patent: Jul. 4, 2000

[54] CORRECTION FLUIDS COMPRISING COMPOSITE POLYMERIC PARTICLES

[75] Inventors: Brian Edward Causton, Reading; Michael Sotiracis Alexiou, Twickenham; Frederick Charles Baines, Dunstable, all of United Kingdom

[73] Assignee: The Gillette Company, Boston, Mass.

[21] Appl. No.: 08/882,633

[22] Filed: Jun. 25, 1997

[51] Int. Cl.⁷ ....................................................... B32B 5/16
[52] U.S. Cl. ......................... 428/327; 428/407; 523/161
[58] Field of Search .................. 428/327, 407; 523/161

[56] References Cited

U.S. PATENT DOCUMENTS

| | | |
|---|---|---|
| 2,361,515 | 10/1944 | Weidlich . |
| 3,281,344 | 10/1966 | Thomas . |
| 3,674,729 | 7/1972 | Mirick . |
| 3,884,871 | 5/1975 | Herman et al. . |
| 3,897,375 | 7/1975 | Takahashi et al. . |
| 3,897,586 | 7/1975 | Coker . |
| 3,956,008 | 5/1976 | Knepper et al. . |
| 3,970,629 | 7/1976 | Izaki et al. . |
| 3,997,498 | 12/1976 | Reese et al. . |
| 4,023,981 | 5/1977 | Perronin et al. . |
| 4,036,652 | 7/1977 | Rothmayer . |
| 4,036,663 | 7/1977 | Williams et al. . |
| 4,069,186 | 1/1978 | Ramig . |
| 4,111,878 | 9/1978 | Ruhf . |
| 4,148,944 | 4/1979 | Ruhf . |
| 4,157,323 | 6/1979 | Yen et al. . |
| 4,165,988 | 8/1979 | Page et al. ................................ 106/23 |
| 4,194,920 | 3/1980 | Burke, Jr. . |
| 4,206,094 | 6/1980 | Yen et al. . |
| 4,225,496 | 9/1980 | Columbus et al. . |
| 4,254,201 | 3/1981 | Sawai et al. . |
| 4,264,700 | 4/1981 | Bayley . |
| 4,283,320 | 8/1981 | Carroll et al. . |
| 4,358,388 | 11/1982 | Daniel et al. . |
| 4,367,171 | 1/1983 | Leifels et al. . |
| 4,400,441 | 8/1983 | Minnis et al. . |
| 4,421,620 | 12/1983 | Kaylo et al. . |
| 4,436,789 | 3/1984 | Davis et al. . |
| 4,456,507 | 6/1984 | Kivel et al. . |
| 4,654,081 | 3/1987 | Dalzell ..................................... 106/23 |
| 4,665,107 | 5/1987 | Micale . |
| 4,687,789 | 8/1987 | Gonnet et al. . |
| 4,775,420 | 10/1988 | Gonnet et al. . |
| 5,199,976 | 4/1993 | Yau et al. .............................. 106/19 A |
| 5,256,191 | 10/1993 | Thompson et al. ................... 106/19 A |
| 5,256,703 | 10/1993 | Hermann et al. . |
| 5,306,755 | 4/1994 | Yau et al. ............................... 524/296 |
| 5,332,599 | 7/1994 | Sanborn .................................. 427/259 |
| 5,338,775 | 8/1994 | Matz et al. .............................. 523/161 |
| 5,370,922 | 12/1994 | Sanborn et al. . |
| 5,464,883 | 11/1995 | Sharma et al. . |
| 5,480,920 | 1/1996 | Sharma et al. .......................... 523/161 |
| 5,500,455 | 3/1996 | Terakawa ................................ 523/161 |
| 5,516,223 | 5/1996 | Matz et al. .............................. 401/260 |
| 5,578,117 | 11/1996 | Matz et al. ............................ 106/19 A |
| 5,594,045 | 1/1997 | Alexiou .................................. 523/161 |
| 5,726,221 | 3/1998 | Alexiou .................................. 523/161 |

FOREIGN PATENT DOCUMENTS

| | | |
|---|---|---|
| A1-60131/80 | 4/1980 | Australia . |
| 47-33055 | 8/1972 | Japan . |
| 58-156097 | 9/1983 | Japan . |
| 2-185577 | 7/1990 | Japan . |
| 3-183136 | 1/1993 | Japan . |
| 2 058 110 | 4/1981 | United Kingdom . |
| WO 92/22613 | 12/1992 | WIPO . |
| WO 94/29393 | 12/1994 | WIPO . |
| WO 96/23031 | 1/1996 | WIPO . |
| WO 96/23843 | 8/1996 | WIPO . |

OTHER PUBLICATIONS

Robinson, "Calcium Metasilicate—Wollastonite—Unique Functional Extender for Anti–Corrosion, High Solids and Water–Borne Coatings", *Polymeric Materials Science & Engineering*, 70:175–76 (1994).

Henkel, "Nopco 8034 Defoamer for Synthetic Latex Systems" Data Sheet ARC–143 (Oct. 1992).

Henkel, "Nopcosperse 44 Pigment Dispersant" Data Sheet ARC–102 (1991).

Rohm and Haas Company, "Experimental Emulsion E–726" [PR–26] brochure (Oct. 1991).

NYCO, "Benefits of 10 Wollastokup" brochure (1990).

UCAR, "UCAR Latex 100 for Water–Based Clear Caulks and Sealants" brochure (1987).

*Primary Examiner*—Hoa T. Le
*Attorney, Agent, or Firm*—Fish & Richardson P.C.

[57] ABSTRACT

A correction fluid containing a composite that includes particles composed of a film-forming polymer, and a polymeric material.

21 Claims, 10 Drawing Sheets

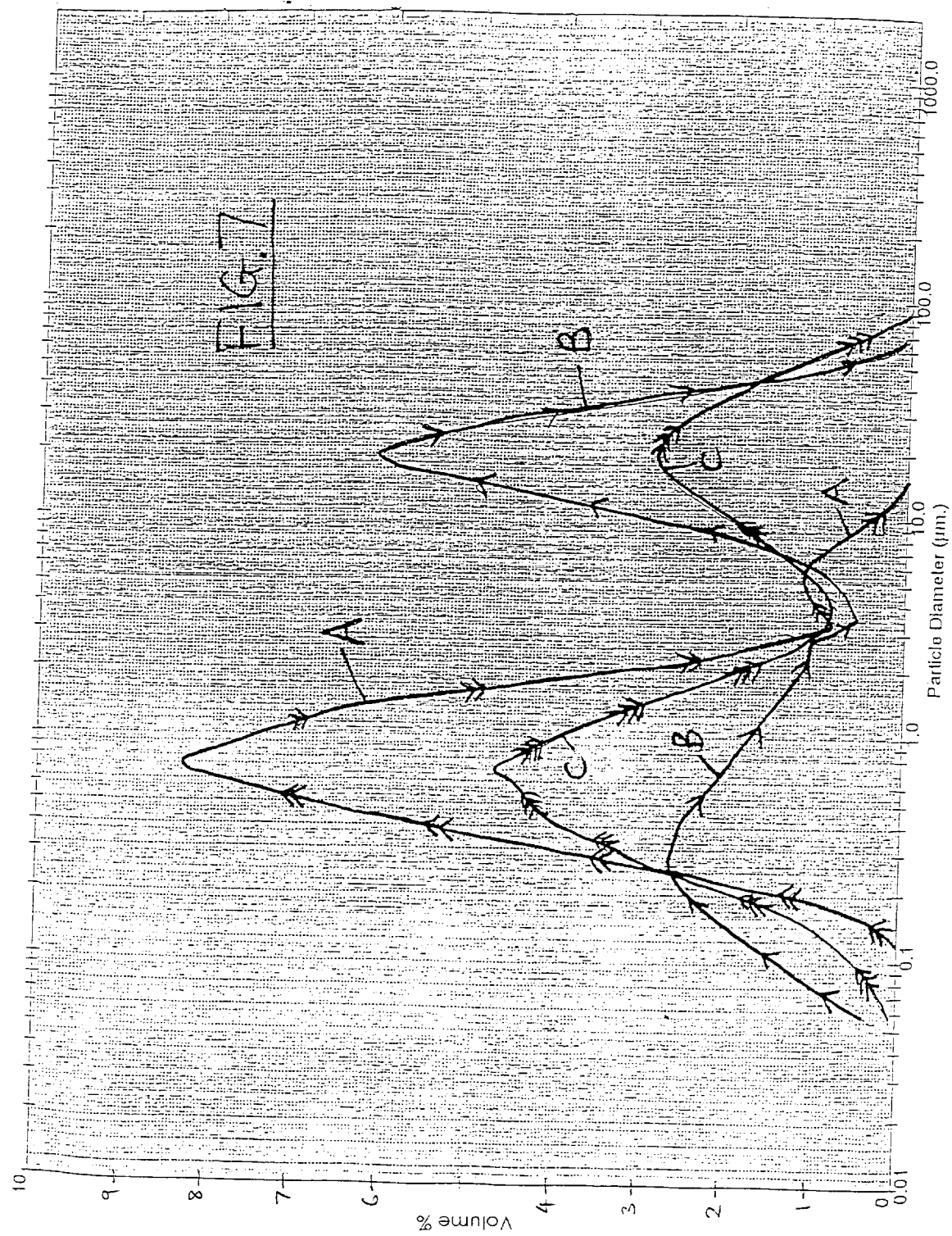

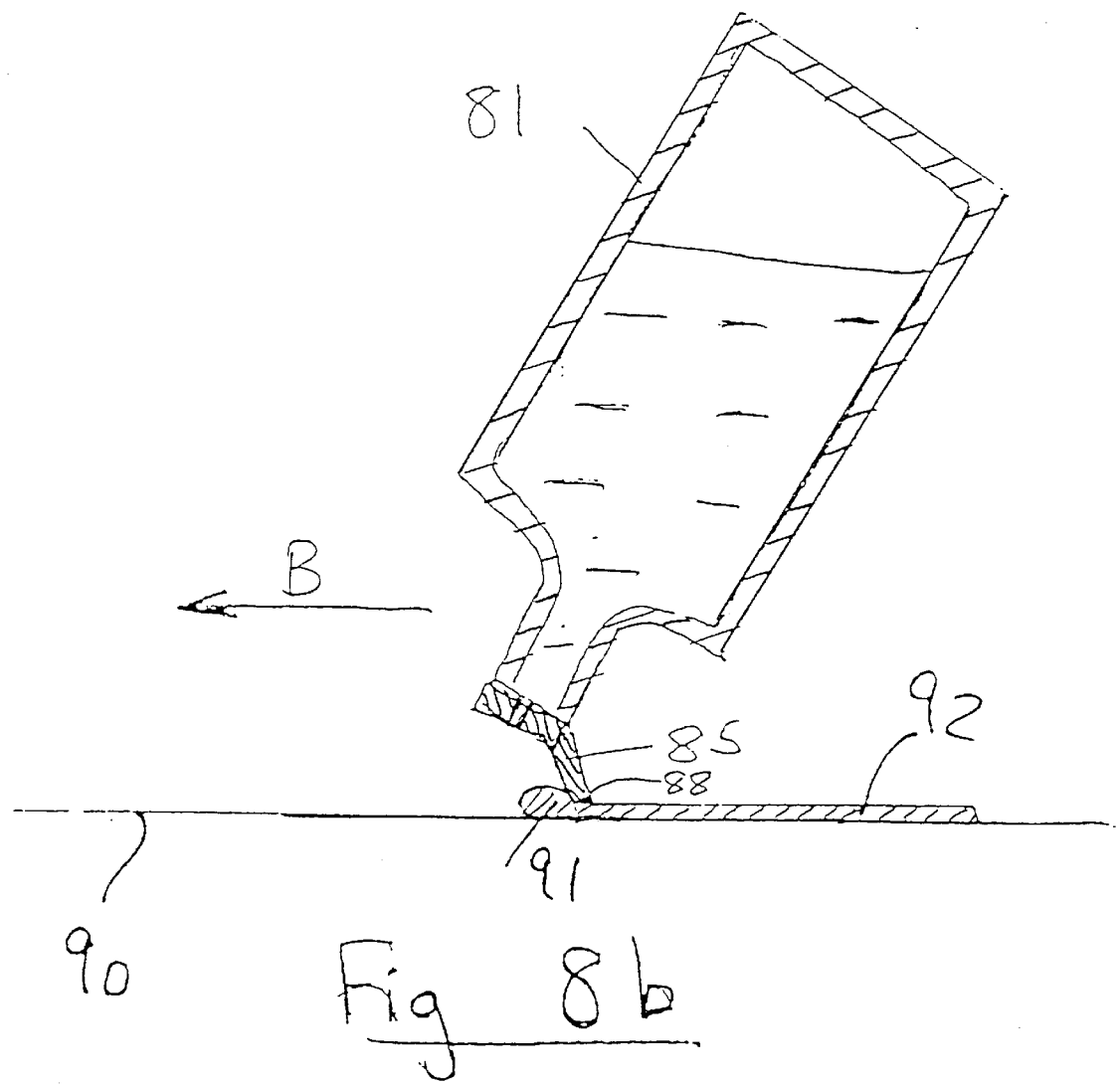

CORRECTION FLUIDS COMPRISING COMPOSITE POLYMERIC PARTICLES

CROSS REFERENCE TO RELATED APPLICATIONS

This application claims priority from British Patent Application No. 9707181.5, filed on Apr. 9, 1997.

BACKGROUND OF THE INVENTION

This invention is concerned with aqueous correction fluids, with a method of preparing them and with a composite particulate material useful therein.

DESCRIPTION OF THE PRIOR ART

Correction fluids are fluids which are used by typists and others to cover typing, writing, printing or drawing errors or the like and which when dried sufficiently can, for example, be typed, written or drawn over. The fastest writeover times for correction fluids have been achieved using volatile organic solvents, but the use of such materials has become much less desirable for environmental reasons and, in some cases, because of the risk of abuse. Correction fluids containing water-based liquid media are not subject to these disadvantages, but they usually have greater writeover times than the organic solvent compositions. "Writeover time" for the purposes of this discussion means the time required for the surface of the applied correction fluid to dimensionally stabilize sufficiently enough so the subsequent mark applied to the surface of the correction pigments with polymeric material.

U.S. Pat. No. 4,665,107 describes the preparation of sub-micron-sized pigment particles encapsulated by a polymer matrix, for use, for example, in inks. The pigment particles are dispersed in a solution of the polymer, and this mixture is dispersed in water to form an emulsion. Solvent is then removed to form the polymer-encapsulated pigment particles.

U.S. Pat. No. 3,884,871 describes coating pigment particles with polymer to prevent or reduce agglomeration of the pigment in paints. An anchoring agent is first adsorbed on the pigment particle surfaces and then organic vinyl monomer is added and polymerized to form a coating on the particles. The pigment particles are individually coated and remain in the sub-micron size range. U.S. Pat. Nos. 4,421,620, 4,665,107, 3,281,344, 3,897,586, 4,023,981, and 4,036,652 also describe similar processes in which pigment particles are encapsulated with polymer.

U.S. Pat. No. 4,194,920 describes an intrachromoleucospheruloid pigment composition. Spheruloids of organic polymer (from ethylenically unsaturated monomer) of a size up to 4 microns have pigment particles embedded therein. The spheruloids are produced by aqueous emulsion polymerization. U.S. Pat. Nos. 4,264,700 and 4,358,388 describe particulate composite materials which contain magnetic particles dispersed in a polymer. The particulate composite materials are made by polymerizing monomer in the presence of the magnetic particles.

U.S. Pat. No. 4,254,201 describes a pressure sensitive toner which is a particulate composite material. The toner particles are porous aggregates each consisting of a cluster of a multiplicity of granules of pressure-sensitive adhesive encapsulated by a relatively thin, frangible coating of, for example, a film-forming material. Particles of pigment or magnetic material are contained within the aggregates in the interstices between the granules. The granules adhere to each other owing to adhesion that occurs between the encapsulating films during spray fluid is neatly legible and not smeared or smudged into the correction fluid surface.

It should be well understood that the correction fluid may still contain water, and therefore not yet be completely dry; yet the surface will have dimensionally stabilized sufficiently to permit writeover. The water remaining in the correction fluid at the time of writeover will thereafter evaporate from the surface, and/or dissipate into the supporting paper. "Writeover time" therefore typically occurs before the correction fluid is completely dry.

With a view to reducing the writeover time of aqueous correction fluids, attempts have been made to increase their solids loading (and thus reduce the amount of aqueous liquid therein). This approach has given some success, but can no longer be used because, in general, current aqueous correction fluids already have the minimum writeover time achievable by maximizing solids loading. If attempts are made to include more solids, the dispersions become unstable due for example to settling and agglomeration of the solids, and there is a loss of lay-down facility. The addition of extra solids, e.g., fillers, leads to a significant increase in viscosity without any concomitant reduction in writeover time. That is to say, the fluids become thicker but do not permit writeover any more quickly. Indeed, the addition of extra conventional fillers to an aqueous correction fluid can result in an increase in writeover time. Put shortly, we believe it is not possible by simple changes in proportions of solids, to reduce any further the writeover times of current aqueous correction fluids (without adversely affecting their performance).

We have now found that the writeover times of aqueous correction fluids can be reduced, and other improvements obtained, by including in the fluids novel particles of composite materials.

Particles composed of two or more discrete components held together to form an integral whole, (hereinafter generally referred to as "composite particles"), are known. There are, for example, a large number of patents describing particulate composite materials formed by coating particles such as drying. A binder can also be provided in the spaces between the granules, to improve the adhesion. The individual porous aggregates, as a whole, are approximately spherical in shape with a rough surface like an orange. In use, under the pressure applied to fix the toner, the aggregates are broken apart into separate granules, and the encapsulating films break to release the pressure sensitive adhesives therein.

U.S. Pat. Nos. 4,206,094 and 4,157,323 disclose polymeric functional microspheres containing metal or metal compounds, the microspheres being formed by addition polymerization of a covalently bondable olefinic monomer in the presence of finely divided metal or metal oxide particles, such as iron, gold, platinum or magnetite, which are embedded in the resulting microspheres. The microspheres are then used in labelling and separating biological cells. The addition polymerization can be effected by high energy gamma radiation. The process is either an aqueous suspension polymerization process or an aqueous emulsion polymerization.

SUMMARY OF THE INVENTION

We have now devised some particulate composite materials which are especially useful in aqueous correction fluids. The presence of these particles can reduce drying time and/or provide an improved stability in the correction fluids, and can also provide much higher solids loadings, if desired.

In accordance with a first aspect of the present invention, there is provided a material for use in a fluid, said material comprising: a plurality of film forming binder particles; a polymerized polymeric material containing a portion of said film forming binder particles; said portion of said binder particles in combination with said polymerized polymeric material forming composite material particles; said composite material particles when polymerized, fixing said binder particles contained within said composite material particles relative to each other, said composite material particles having a substantially spherical outer surface and a diameter of from about 0.1 to about 100 micrometers, and a portion of said binder particles being bound adjacent the outer surface of said composite material particles.

In a second aspect, the invention provides a method of making a material for use in an aqueous correction fluid, said method comprising the steps of: providing film-forming binder particles; providing a polymerisable liquid; mixing said polymerisable liquid and said film-forming binder particles together; and polymerizing the polymerisable liquid to form a suspension of composite material particles; each composite material particle having a portion of said film forming binder particles included therein; said polymeric material of said composite material particles contacting said binder particles to fix said binder particles relative to each other, a portion of said film forming binder particles bound adjacent the outer surface of said composite material particles; and said composite material particles have a diameter of from about 0.1 to about 100 micrometers.

In another aspect, the invention provides an aqueous correction fluid which comprises:

(a) an aqueous latex comprising particles of at least one film-forming binder suspended in an aqueous medium;

(b) opacifying particles; and (c) material of the invention;

wherein said opacifying particles and said material are in suspension in said aqueous medium.

In a further aspect of the invention, there is provided a method of making an improved correction fluid, which comprises the steps of:

(a) dispersing a polymerisable liquid in an aqueous correction fluid, said correction fluid including particles of at least one film-forming binder;

(b) polymerizing the polymerisable liquid to form an aqueous suspension of composite material particles; said polymeric material contacting a portion of said film- forming binder particles to fix them relative to one another to form said composite material particles; and (c) adding the aqueous suspension to further correction fluid.

Preferably, in this method:

(d) said composite material particles have a substantially spherical outer surface;

(e) said outer surface includes some of said particles of film-forming binder; and (f) said composite material particles are of a size in the range of from about 0.1 to about 100 micrometers in diameter. The film-forming binder particles are of course smaller than the composite material particles.

In a further aspect, the invention includes a correction fluid applicator which comprises a container for correction fluid, an outlet for dispensing fluid from the container and an edge shear member integral with the applicator for spreading dispensed fluid under shear.

The invention also provides a method of coating a surface with a correction fluid, said method comprising the steps of: providing a correction fluid of the invention and applying the correction fluid to said surface.

The particles of composite material of the invention each comprise a plurality of (by which we mean at least two) smaller particles of at least one film forming binder, which smaller particles are bound together and so fixed relative to each other by the polymer formed on polymerization of the polymerisable liquid. This polymer is cross-linked. The composite material particles can also include smaller particles of other solids such as opacifying particles, e.g. pigments. Generally, in each composite material particle, the plurality of smaller particles will be very close to each other or be touching, so that the polymer formed from the irradiation-polymerisable liquid fills the gaps or interstices between the plurality of smaller particles. The smaller particles are thus bound together and thus fixed relative to each other, by the hardened polymer. Some binding can also occur by surface entanglement processes between adjacent binder particles such that some binder particles can become bound directly to each other. By entanglement processes, we mean that polymer chains extending from a binder particle surface tangle with similar chains from an adjacent binder particle to bind the binder particles together.

The composite material particles will preferably have film-forming binder particles on their outer surface as well as binder particles partially and totally within the composite particle.

The outer surface of each particle of composite material is substantially spherical, i.e., the composite particles will be generally rounded and substantially free of edges and will promote easy close packing in films. It is felt that a novel feature of the invention lies in the compaction of the binder particles and composite particles when the correction fluid is applied.

The particles of composite material in accordance with the invention generally have a relatively low surface area in relation to their volume. They are generally non-porous and will generally be relatively non-absorbent towards the aqueous suspending medium of the correction fluid. In preference, they will generally have a relatively smooth surface.

The size (diameter) of the composite particles will normally be in the range of from 0.1 to 100 micrometers, preferably 0.1 to 50 micrometers, the average composite particle size being about 20 to 30 micrometers. By average particle size we mean the size of particle at which 50% of the sample is smaller and 50% is larger than this size: this value is also known as the mass median diameter. For use in correction fluids of the invention, the composite material particles will generally be of larger size than the opacifying particles and film-forming binder particles normally used in aqueous correction fluids. Thus, for example, with opacifying particles and film-forming binder particles of a size of about 0.5 micrometers, a typical composite material particle of about 20 micrometers in size would contain about 50,000 of the smaller binder particles therein.

We have found that it is advantageous (though not essential) for the size distribution of the composite material particles to be about one order of magnitude or more (expressed in micrometers). Thus, for example, if the average particle size of the composite material particles is about 20 micrometers, the composite particles will preferably range in size from, for example, about 0.1 to about 50 micrometers. This promotes good packing of the particles on application of the correction fluid and is also believed to contribute to a particularly preferred fast-hardening effect to be described hereinafter. It is also preferred that the composite material particles are at least ten times, and preferably up to about one hundred times, the size of the film-forming binder particles: the opacifying particles are normally of a similar size to the film-forming binder particles.

More specifically, the composite material particles of the invention, for use in correction fluids, are preferably made by dispersing an irradiation polymerisable liquid, as a multiplicity of discrete volumes, in an aqueous latex of at least one film-forming binder, and then irradiating the liquid to polymerize it. This process is not the same as a conventional suspension polymerization process, in which globules of a polymerisable liquid are suspended in a medium and polymerized, without interaction with the medium, to produce polymerized "globules". In the present invention, the discrete dispersed volumes of polymerisable liquid are not present in the latex in the form of spherical globules, but surprisingly are of a flattened laminar shape. For example, the volumes can be of a generally disc-like shape through oval to a ribbon-like shape. The size can vary but we generally prefer the volumes to have a thickness of about 1 to 6 micrometers and a "diameter" or length of about 5 to 20 micrometers. Smaller or greater volumes can be used. The shapes and sizes of these discrete dispersed volumes are quite different from the shapes (generally spherical) and sizes (larger) of the composite particles formed therefrom. In the spaces between the discrete dispersed volumes of polymerisable liquid is the aqueous latex of film-forming binder particles. FIG. 2 of the accompanying drawings illustrates the dispersion before polymerization, and is described in more detail hereinafter.

Upon irradiation, the dispersed volumes of polymerisable liquid are polymerized and adjacent volumes of the polymerisable liquid combine to form the composite material particles incorporating the film-forming binder particles. The resulting composite material particles are far larger than the discrete dispersed laminar volumes of polymerisable liquid. For example, whilst the size of a discrete dispersed laminar-shaped volume of polymerisable liquid could be from 5 to 20 micrometers in length and from 1 to 6 micrometers in thickness (smaller volumes may also be present), the size of a composite particle could normally be up to about 100 micrometers in diameter. The composite material particles are heterogeneous throughout, having film-forming binder particles therein, and hardened polymer formed from the irradiation polymerisable liquid, and possibly other particles such as opacifying particles. The composite material particles have film-forming binder particles contained therein and exposed at the surface of the composite particles.

The process of the present invention by which the composite material particles are made is to be distinguished from conventional emulsion polymerization processes. In such conventional processes, an initiator dissolved in the aqueous phase enters surfactant micelles in which some of the water-insoluble monomer is solubilized, and they initiate the polymerization therein. By contrast, in the irradiation process of the present invention, the polymerization takes place within the monomer volumes dispersed throughout the aqueous phase.

The composite material particles of the present invention are used in aqueous correction fluids. For example, they can be added to a previously formed correction fluid to increase the solids loading thereof, or they can be mixed with a compatible film forming latex material and/or opacifier to form a correction fluid. By "compatible film forming latex material", we mean one which is not of opposite polarity to the film-forming binder particles used in the composite material particles. Thus, the composite material particles can be mixed with a non-ionic film forming latex but they can only be mixed with an anionic film forming latex when the composite material particles have been made from a non-ionic or an anionic film forming latex. Similarly, when the composite material particles have been made from a cationic film forming latex, they cannot be mixed with an anionic film-forming binder latex.

However, instead of using the composite material particles of the invention in the above described ways, we prefer to make the composite material particles in situ in a correction fluid. This is effected by dispersing the irradiation polymerisable liquid in the correction fluid, and then irradiating. In this way, the film-forming binder particles in the composite material are the same as the film-forming binder particles of the correction fluid itself and are thus compatible. When this is done, the resulting correction fluid will generally contain too little free film-forming binder (by "free film-forming binder" we mean particles of film-forming binder which have not become part of a composite material particle) to form a coherent film when coated on a substrate and dried. The coating tends to crumble and fall off the paper. Even if the amount of film-forming binder in the correction fluid is increased above the normal level (for that fluid) before the composite material particles are formed therein, the result is still not very satisfactory. However, if the amount of film-forming binder is increased after irradiation, such as by adding more (untreated non-irradiated) correction fluid, having compatible film-forming binder therein, the results are extremely advantageous as will be discussed hereinafter.

It is preferred, in accordance with the invention, that the film-forming binder used in the preparation of the composite material particles of the invention be the same as, or closely similar to, the film-forming binder of the further correction fluid in which the suspension is mixed in step (c). This ensures the desired compatibility to achieve a stable dispersion and good film formation. Absolute identity between the two film-forming binders is not essential (though it is preferred): chemical similarity will suffice provided the two compatible binders can coalesce together satisfactorily at film formation.

In the method of making the composite material particles of the invention, irradiation polymerisable liquid is dispersed in an aqueous latex of at least one film-forming binder, and then polymerized. The irradiation polymerisable liquid is a liquid (at ambient temperature) monomer or oligomer containing ethylenic unsaturation. Upon exposure to radiation, the monomer or oligomer undergoes addition polymerization via the ethylenic unsaturation. There are many different irradiation polymerisable liquids which can be used. We prefer to use acrylate and methacrylate monomers, especially bisphenol A propyl dimethacrylate (available as Hi-Tad from London Resin Company, London, England). Other specific examples include ethylene glycol dimethacrylate, triethylene glycol dimethacrylate and tetraethylene glycol dimethacrylate. More generally, members of the following groups of irradiation polymerisable monomers or oligomers are preferred, viz. bisphenol A aliphatic urethane dimethacrylates, bisphenol A aliphatic epoxy dimethacrylates, and bisphenol A aliphatic ester dimethacrylates. Specific examples of suitable irradiation polymerisable liquids are as follows. These are available from Cray Valley, 92970 Paris La Defense, France, and the catalogue designation is given in parentheses.

a) epoxy acrylate oligomers
  standard bisphenol A epoxy diacrylate (CN104), epoxidized soya bean oil diacrylate (CN111)

b) urethane acrylate oligomers
   aliphatic urethane triacrylate (CN931 A60) aromatic urethane triacrylate (CN970 A60)
c) oligo acrylates
   tris (2-hydroxyethyl) isocyanurate triacrylate (SR 368)
d) oligo ether acrylates
   polyethylene glycol 400 diacrylate (SR 344) ethoxylated trimethylopropane triacrylate (SR 454)
   ethoxylated pentaerythritol tetra acrylate (SR 494)
e) difunctional acrylate monomers
   tripropylene glycol diacrylate (SR 306)
f) trifunctional acrylate monomers
   trimethylolpropane triacrylate (SR 351)

Other examples include dipentaerythritol hexaacrylate and aromatic urethane diacrylate.

The amount of irradiation polymerisable liquid used should not be so much that, when dispersed in the aqueous latex of film-forming binder particles, the dispersion is converted to a solid block on irradiation. Routine trial and experiment in any particular case will reveal optimum amounts. When the latex is in a correction fluid, we have found that the amount of irradiation polymerisable liquid used should generally be less than about 50% by weight of the mixture of irradiation polymerisable liquid and the other ingredients of the correction fluid. The amount of irradiation polymerisable liquid will, of course, determine the amount of composite material particles in the resulting particulate suspension produced by the polymerization The irradiation polymerisable liquid is preferably uniformly dispersed throughout the aqueous latex of film-forming binder before polymerization. This can be achieved by using standard mixers, such as a Dispermat mixer. As described above, the discrete volumes of the irradiation polymerisable liquid are not in globular form but rather exist in a flattened laminar, e.g., disc-like or pancake-like, shape in the aqueous latex of film-forming binder.

In the method of making the composite material particles of the invention, the irradiation polymerisable liquid (monomer or oligomer) is polymerized by irradiation, i.e., by exposure to light, electron beam, microwave or gamma radiation. We prefer to use light (using a photo initiator) or, more preferably, electron beam irradiation. The radiation doses required to effect polymerization will, of course, depend on the particular monomer or oligomer being polymerized and on the overall system, but electron beam irradiation doses of up to about 10 MRad have been found satisfactory for Hi-Tad and similar materials.

The correction fluids of the invention contain, in addition to the composite material particles of the invention, opacifying particles and film-forming binder particles.

The opacifying particles used in the correction fluids of the invention can be any pigment suitable for the purpose, the most usual being titanium dioxide. Where a color other than white is needed, other pigments or colorants can be included to give the desired effect. In general, the opacifying particles will have an average particle size of less than 0.8 micrometer (to increase dispersibility), and the particles may have been pre-treated with alumina or a combination of alumina and silica to increase dispersibility.

The amount of opacifying particles in the correction fluids of the invention will generally be from 20% to 70%, preferably from 25% to 60%, and most preferably from 30% to 50%, by weight. Preferably, the average particle size will be about 0.4 micrometers or less. Suitable titanium dioxide pigments include commercially available rutile titanium dioxide and anatase titanium dioxides, or blends or mixtures of these which preferably have an average particle size from approximately 0.2 micrometers to 0.4 micrometers and an average oil absorption of about 16 g/100 g pigment.

One preferred titanium dioxide is Ti-Pure R-900 (DuPont, Wilmington, Del.), which is rutile titanium dioxide composition manufactured by the chloride process. (Ti-Pure is a trademark.) This composition includes about 94% titanium dioxide, and 4.S% alumina. The particle size varies, but 80% of the particles are 0.4 micrometer or smaller, and 90% of the particles are under 0.6 micrometer.

Other suitable titanium dioxide compositions include Ti-Pure R-901, Ti-Pure R-902, Ti-Pure R-931, Tioxide R-XL (Tioxide America, Inc., Columbia, Md.) and Kronos 2131 (Kronos, Inc., Houston, Tex.). Other opacifying particles may be used either alone or, preferably, in combination with titanium dioxide. Such pigments include zinc sulfide and zinc oxide.

The film-forming binder used in the composite material particles of the invention and in the correction fluids of the invention can be any natural or synthetic polymer which forms a continuous and cohesive film on loss of aqueous suspending medium or solvent at ambient temperature. The film-forming binder particles preferably consist only of film-forming binder.

Examples of suitable film-forming binders include:
a) styrene acrylic copolymers, such as a copolymer of 40% styrene/55% ethyl acrylate/5% divinyl benzene.
b) styrene methacrylic copolymers, such as a copolymer of 40% styrene/55% butyl methacrylate/5% divinyl benzene (and UCAR materials referred to hereinafter).
c) ethylene vinyl acetate copolymers, such as a copolymer of from 8 to 25% ethylene and from 92 to 75% vinyl acetate.
d) vinyl acrylic copolymers, such as a copolymer of 60% vinyl acetate/40% styrene.
e) acrylic polymers, such as a copolymer of 70% methylmethacrylate/28% ethyl acrylate/2% divinyl benzene.
f) vinyl acetate or vinyl alcohol polymers, such as polyvinyl acetate, and copolymers.
g) polyurethanes (Witco polymers described hereinafter).
h) cationic methacrylate copolymers, such as a copolymer of 75% methylmethacrylate/25% dimethylaminoethylmethacrylate.

The film-forming binder is used in the form of an aqueous latex, that is to say a dispersion of particles of the film-forming binder in an aqueous suspension medium, the particles being small enough to remain suspended as a result of Brownian motion thereof. Generally, the particles will be no greater than about 10 micrometers (in diameter) and more usually they will be less than 1 micron in diameter. When composite material particles of the invention are made by dispersing an irradiation-polymerisable liquid in an aqueous latex of film-forming binder, and irradiating, at least some and sometimes most of the film-forming binder particles become included within the composite material particles that are formed. Any film-forming binder particles which do not become part of the composite particles remain free in suspension.

The majority of water-soluble dyes used in aqueous inks are anionically charged. The use of aqueous correction fluids containing anionically and/or non-ionically stabilized film-forming binder dispersions and pigments can lead to bleed of these water-soluble dyes into the correction layer and formation of an unsatisfactory correction. To prevent the bleeding of the dyes, a cationic species which will interact with the anionic dye molecules rendering them insoluble and unable to diffuse through the correction can be included in the formulation as a non-bleed agent. This non-bleed agent may be a cationic film-forming polymer, for example Worleecryl 8721 (Worlee Chemie GmbH,Hamburg, Germany), a cationic non-film-forming polymer, for example Rhoplex R PR-26 (Rohm & Haas, Philadelphia) or a non-polymeric cationic species capable of forming complexes with anionic dyes, rendering them insoluble. Examples of materials which act in this way are diquaternary ammonium compounds of the type described in British Patent Application 9211760.5 (included by reference herein in its entirety), for example 1,2-ethanediaminium-N,$N^1$-ditetradecyl-N,N,$N^1$,$N^1$-tetramethyl dibromide.

Dispersions of film-forming binders in water are stabilized by addition of surfactant. The surfactant may be anionic, cationic or non-ionic in character. It is important that the charge carried by the surfactant is compatible with that on other species in the fluid to prevent interaction which may lead to destabilization of the polymer dispersion. The majority of available film-forming polymer dispersions are anionically stabilized making them unsuitable for use with cationic non-bleed agents. Advantageously, the film-forming binder is stabilized with a cationic surfactant. Examples are Vinamul 90045 (vinyl acetate/dimethylamino ethyl methacrylate copolymer) (from Vinamul Ltd., Carshalton, Surrey, U.K.), Witcobond W-2123, (polyurethane from Witco Corporation, Chicago, Ill., U.S.A.), Primal LE-1126 (or E-1179N or E-1242) (self-crosslinking acrylic emulsion from Rohm and Haas Company, London, England) and Vinac XX210 (or XX220, XX230 or XX240) (all vinyl acetate homopolymer emulsions from Air Products, Allentown, Pa., U.S.A.). Examples of non-ionic systems include Vinamul 6955 (vinyl acetate/Veova Shell Chemicals/other olefins) and Vinamul 6975 (vinyl acetate/Veova).

We describe in detail hereinafter certain correction fluids of the invention which are very fast setting. In these fluids, we prefer to use a soft film-forming binder to give a flexible film, i.e., a film-forming binder latex in which the film-forming binder has a glass transition temperature of less than 12° C. However, in the case of correction fluids of the invention which are not especially fast setting, then it can be advantageous to include two or more film-forming binders in the latex. Thus, for example, the correction fluids can include a soft film-forming binder and a hard film-forming binder (i.e., a binder having a glass transition temperature greater than 12° C.). Alternatively, the correction fluid may include only one film-forming binder if the binder has a glass transition temperature of between 10° C. and 17° C.

The preferred soft film-forming binders have a glass transition temperature of less than 10° C. Film-forming binders having a glass transition temperature of less than 12° C. include styrene-acrylic copolymers, styrenemethacrylic copolymers, ethylene-vinyl acetate copolymers, vinyl acrylic polymers and acrylic polymers. Specific examples include $UCAR^R$ Latex 446 (Tg=9° C.) (Union Carbide, Cary, N.C., U.S.A.), $UCAR^R$ 100, 76 RES 4170 (from Rohrn and Haas Company, Philadelphia, Pa., U.S.A.), Airflex 426, (from Air Products, Allentown, Pa., U.S.A.), $UCAR^R$ 354, and $UCAR^R$ 415. $UCAR^R$ Latex 446 is a particularly preferred film-forming binder with a low glass transition temperature. It is a latex emulsion including synthetic acrylate/styrene polymers that is non-ionically stabilized. UCARR 446 Latex includes about 38% water and 62% copolymer of methyl methacrylate, butyl acrylate, styrene, methacrylic acid, and 2-hydroxyethyl acrylate. It also includes about 0.03% formaldehyde and 0.02% ammonia. In general, the amount of soft film-forming binder needed in a correction fluid to give the desired softness and flexibility to the film will be between about 2% and about 12% (more preferably between about 4% and about 9%) by weight.

Hard film-forming binders include, for example styrene acrylic copolymers, styrene-methacrylic copolymers, ethylene-vinyl acetate copolymers, vinyl acrylics, acrylics. Examples include $UCAR^R$ Latex 144 ((Union Carbide) Tg=20° C.) $UCAR^R$ 503, $UCAR^R$ 422, and $UCAR^R$ 51. $UCAR^R$ Latex 144 is particularly preferred. $UCAR^R$ 144 includes about 52% water and 48% copolymer of butylacrylate, styrene, methacrylic acid. It also includes about 0.1% ammonia. The amount of hard film-forming binder used is such as to provide the hardness of the film as desired. Generally, the amount of any hard film-forming binder present in a correction fluid will be between about 3% and about 12% (more preferably between about 4% and about 9%) by weight. The preferred weight ratio (on a dry basis, i.e., in terms of the respective solids contents) of hard to soft film-forming binder is between about 70:30 and about 20:80, and more preferably between about 40:60 and about 60:40.

The correction fluids of the invention preferably have a viscosity of between about 50 and 500 mPa s, more preferably between about 80 and 300 mPa s (as measured at 50 $s^{-1}$ shear). The correction fluids to be applied by brush will preferably have a total solids content of at least 60%, and more preferably a total solids content of at least 65%. The very fast setting fluids to be described hereinafter will usually have solids contents of over 70%. Preferably, correction fluids of the invention will also include one or more dispersing agents and surfactants.

The overall ratio of opacifying particles (including any extender pigments, colorants, etc.) to film-forming binder should preferably be between about 5:1 and about 3:1, and more preferably between about 4:1 and about 3.7:1.

The correction fluids of the invention may contain acicular particles to dimensionally stabilize the film that is formed. The preferred acicular particles are less than about 0.1 mm in length, and have an aspect ratio of between about 15:1 and about 2:1, and more preferably have an aspect ratio of between about 5:1 and about 10:1. (Aspect ratio is the ratio of the major dimension to the minor dimension.) Particularly preferred acicular particles are composed of calcium metasilicate and are sold under the trade name NYAD 400 (NYCO Minerals, Inc., Willsboro, N.Y., U.S.A.). Preferably, the correction fluids include between about 0.5% and about 9% (more preferably between about 1% and 5%) of the acicular particles by weight.

The preferred pigment dispersants in the above anionically stabilized systems are sodium salts of carboxylate polyelectrolytes such as $Nopcosperse^R$ 44 (Henkel Corp., Ambler, Pa., U.S.A.) or preferably sodium salts of maleic anhydride copolymers, e.g., $TAMOL^R$ 731 SD (Rohm & Haas, Philadelphia, Pa., U.S.A.) or sodium salts of polymethacrylic acid. In a cationic system, a preferred dispersant would be a fatty quaternary compound such as Hipochem CGB (from High Point Chemical Corp., High Point, N.C., U.S.A.). The dispersant should be added in a sufficient amount to ensure complete dispersion of the high quantity of pigment in the correction fluid at low viscosity and with little or no foam generation. Other suitable polyelectrolytic acrylate dispersants (for anionically stabilized systems) include $TAMOL^R$ 850, or 950. Preferably, the correction fluid includes 0.5% to 1.5%, and more preferably 0.8% to 1.1%, of the dispersant by weight.

The surfactant serves as a wetting agent. Any suitable surfactant can be used. Preferred surfactants are non-ionic and include acetylenic diols and alcohols such as $Surfynol^R$ 104 (Air Products and Chemicals, Inc., Allentown, Pa., U.S.A.) which is 2,4,7,9-tetramethyl-5-decyne-4,7-diol. Preferably, the correction fluid includes about 0.3% to about 2.0%, and more preferably 0.44% to 1.5%, of the surfactant by weight.

The correction fluids may contain extender pigments. Preferred extender pigments include kaolin ("China[[P]')

clay, such as Kaopaque$^R$ 10-S (DryBranch Kaolin Co. Dry Branch, Ga., U.S.A.), which includes greater than 97% kaolin clay (Al2O3.2SiO2.2H2O), less than 3% water, and 0.35% of a sodium polyacrylate/soda ash dispersant. Other suitable kaolin clays are NcNamee Clay (R.T. Vanderbilt, Inc., Norwalk, Conn., U.S.A.) and Huber 40C (J.M. Huber Corp., Macon, Ga., U.S.A.). The extender pigment is added in an amount that enhances the ability to write with ballpoint pen ink over the corrected spot. Preferably, the correction fluid should include 5% to 15%, and more preferably 5% to 10%, of the extender pigment by weight.

To color match, e.g., lined notebook paper, the titanium dioxide primary pigment can be tinted with other pigments, such as black, burnt umber, and blue, using standard color matching techniques. The preferred black pigment is an aqueous dispersible carbon black such as Mars Black. A preferred Burnt Umber Dizment is Burnt Umber W-3247, Aurasperse$^R$ (Engelhard Chemical., N.J., U.S.A.). These colorants are used in amounts to color match the shade of white of the paper on which the correction fluid is to be used. Of course, colored correction fluid for colored paper can also be made. Preferably, the correction fluid should include less than 2.0% of the colorant pigments by weight.

The correction fluid may contain a biocide. The biocide is used to prevent bacteria from contaminating the correction fluid. Bactena attack some polymers, and are often found dormant in some of the ingredients, e.g., pigments, used to manufacture correction fluids. A sufficient amount to prevent bacterial growth should be used. Preferably the correction fluid includes about 0.05% to 1.0% of the biocide by weight. The nature of the biocide is not critical. Examples include fluorinated sulphonamides, organic amides and fatty acid modified amides. One particular example is 1,2-benzisothiazolin-3-one.

The correction fluid may contain a defoaming agent. A preferred defoaming agent is Nopco$^R$ 8034 (Henkel Corp., Ambler, Pa., U.S.A.), although any defoaming agent typically used in correction fluids can be used. Such defoaming agents are usually mineral oil derivatives mixed with amorphous silica, and should be added in an amount sufficient to ensure that the correction fluid is deaerated and does not foam when shaken. Preferably, the correction fluid includes 0.05% to 1.0%, and more preferably 0.21% to 0.4%, of the defoaming agent by weight.

The correction fluids of the invention and the aqueous suspensions of composite material particles of the invention comprise solid particles (the composite particles) dispersed in a suspending medium. The medium may be water alone or it may, for example, be a mixture of water and one or more other liquids such as, for example, alcohols, e.g., methanol, ethanol or propanol, or glycol ethers such as 2-methoxyethanol or 2-ethoxyethanol. The medium may contain dissolved substances such as dispersant polymers, chelates for dyes, soluble film-forming binder, or surfactants, for example. The amount of aqueous suspending medium in the correction fluids of the invention is generally from less than 15% to 40%, and preferably from about 15% to 30%.

The correction fluids of the invention can in general be made in a number of ways. For example, the individual components can be mixed in any order or combination. As previously stated, however, we prefer to make the composite material particles in situ in a correction fluid, and then to add more film-forming binder (e.g., further correction fluid containing compatible film-forming binder). Also the invention should be understood not to be limited to irradiation polymerisable materials. Any method of forming composite material particles is included within the scope of this invention, though irradiation polymerization is the most preferred.

We have found, in accordance with the preferred practice of the invention, that the polymerization of the irradiation-polymerisable liquid in situ in a correction fluid comprising an aqueous latex of at least one film-forming binder and opacifying particles, surprisingly enables the solids loading of the correction fluid to be significantly increased without destabilization of the fluid and without unacceptable increases in viscosity. This is due in part, we believe, to the nature of the composite material particles formed by the polymerization of the liquid, and especially to the fact that the composite material particles incorporate film-forming binder particles and possibly other components of the system in which the composite material particles are formed (bound by the polymer formed by irradiation of the irradiation polymerisable liquid), which makes them inherently compatible with the system. In particular, in this way it is possible to disperse the irradiation-polymerisable liquid in a high solids loading dispersion containing a latex of a film-forming binder, and to irradiate to form the composite material particles of the invention, the resulting dispersion being stable and containing a much higher solids loading than previously.

The invention thus provides a technique whereby, for use in collection fluids, the solids loadings of suspensions containing aqueous latexes of film-forming binders, can be increased without loss of stability and without the increase in viscosity which would be expected from such a solids increase. The invention thus provides a way of providing in correction fluids, higher solids loadings than previously possible by conventional techniques, without destabilization and without unacceptable increases in viscosity. In particular, whilst maximum solids loadings with prior known aqueous correction fluids was about 72%, solids loadings of up to about 85% or more can be achieved in accordance with the present invention. While it is not known why the high solids loading material still remains a useable fluid, one possible explanation is that the generally spherical binder particles adjacent the composite particles surface(s) provide additional lubricity between the composite particles. Also, the free binder particles are electrically charged so that until compaction is applied to force them into contact with each other and with the composite particles, when the correction fluid is applied in use, they tend to remain apart. Furthermore, the aqueous phase 6 (see FIG. 3 described hereinafter) between the composite particles containing binder particles 2 also increases the lubricity between the composite particles and maintains the formulation in the fluid state even with an extraordinarily high solids loading. These higher solids fluids of the invention generally have a shorter writeover time than prior known conventional correction fluids, and some can show a nearly instantaneous hardening effect.

The aqueous correction fluids of the invention can be formulated to have the normal writeover time for aqueous correction fluids, e.g., a writeover time of about 40 seconds or more. However, by using higher solids loadings and/or greater proportions of the composite material particles of the invention, the writeover times can be very significantly reduced. We prefer writeover times of less than 30 seconds, more preferably less than 15 seconds and most preferably less than 10 seconds. Indeed, according to a very highly preferred feature of the invention, the fluids can be so formulated that substantially no delay is necessary between applying a correction fluid to paper or another substrate, and applying writeover thereto. Such fluids are unique and constitute, together with their method of preparation, further aspects of the invention per se. ("Writeover" is understood in the art to mean that when writing with a writing implement, no ploughing of the writing tip in the correction fluid occurs, and that the quality and legibility of the ink lay-down is equivalent to the lay-down on paper. The writing implement, e.g., ball pen, is clean and does not pick up soft or tacky correction film. One test procedure for measuring writeover time is described hereinafter with reference to the Examples.)

The invention thus includes a correction fluid which comprises an aqueous suspending medium and opacifying particles, film-forming binder particles and composite material particles of the invention dispersed in said medium, the correction fluid being such that when the fluid is spread as a layer on a substrate, the layer is converted to a solid substantially non-tacky layer within 10 seconds, and most preferably substantially immediately.

The actual time between laying down a layer (or film) of the correction fluid on paper (or another substrate) and its ability to accept writeover can be varied from substantially nil (i.e., no delay whatever) to any desired time. The actual time taken will depend on the solids loading and the proportion of composite material particles of the invention present, as well as on the other components of the fluid. (In general, the greater the solids loading and/or the greater the proportion of composite material particles of the invention, the shorter the writeover time). By routine trial and experiment, a fluid formulation can be chosen to give the optimum qualities in any particular situation. Since, in general, it is preferred to have as short a writeover time as possible, further description of the invention will be directed to correction fluids of the invention which provide minimal writeover time, but it is to be understood that the invention includes correction fluids of longer writeover time.

The highly preferred fast setting correction fluids of the present invention form a solid film immediately or within a second or two, after they are spread on paper or another substrate. Moreover, the entirety of the fluid deposited on the paper becomes solid upon spreading or shortly thereafter. Thus, when a blob of the fluid is deposited on a substrate, the material remains fluid until it is spread whereupon, substantially simultaneously with the spreading, the material is all converted to a dimensionally stabilized material capable of accepting writeover by a writing instrument. The material typically hardens sufficiently to be considered a solid. During the spreading of the fluid material on the substrate, the particles of composite material therein are not broken but remain substantially intact: together with the other particulate matter present, the composite material particles pack together closely to form the hardened material.

In contrast to prior known aqueous correction fluids, the solidification or setting of the correction fluids of the invention is not caused by loss of water but by the application of shear during spreading. Indeed, the immediately set dimensionally stabilized, i.e., "solid" layer will normally contain water which will subsequently be lost in the usual way by evaporation or otherwise.

As soon as solidification has taken place, the dimensionally stabilized film can be written on, typed over or otherwise accept so-called writeover. The fluids can be so formulated that no delay at all after spreading is required, or they can be formulated to need a few seconds or longer delay after spreading, as desired. In some cases, the solidified film will feel dry to the touch immediately upon its formation, but with fluids containing a greater amount of water, the film may initially feel slightly damp. Even so, writeover can be effected substantially immediately and certainly within a very few seconds.

Another highly preferred feature of the invention is in the provision of a correction fluid which can be solidified without the loss of any liquid therefrom and can immediately accept writeover. In another aspect, therefore, the invention provides a correction fluid comprising an aqueous suspending medium, particles of composite material according to the invention, opacifying particles and a film-forming binder latex, which fluid can be solidified to a film without loss of any liquid therefrom, and which film can immediately accept writeover.

These highly preferred correction fluids of the present invention provide dimensionally stabilized, "solid" films in which the opacifying particles are very evenly distributed and, usually, far more evenly distributed, giving a more even opacity than in prior known aqueous correction fluid films. This means that these highly preferred fluids of the present invention can be deposited in thinner layers than prior art correction fluids, without sacrificing opacity, and the use of thinner layers is generally advantageous in the correction fluid art.

The way in which the fast setting correction fluids of the invention are spread to form a smooth opaque film is important. We have found that it is usually preferred to spread the fluid using edge shear, for example with a doctor blade, knife edge or Bird bar to achieve instant hardening. By "edge shear" we mean the shear generated in the fluid between the substrate and a stiff straight edge moved parallel to the substrate, the degree of shear depending on the separation of the edge from the substrate and its speed of movement relative thereto. Spreading with a brush or with a felt or foam spreader, for example, may not be adequate or satisfactory to cause immediate hardening, but is perfectly satisfactory where a delay of a few seconds is acceptable. The special fast setting fluids of the invention are thus preferably dispensed from containers which include an edge shear member, e.g., a knife edge spreader or other means of applying the appropriate shear. In one preferred arrangement, the fluids can be spread using a feed nozzle which includes a spreader edge. If spreading is effected in some other way, the instant solidification may not be obtained in which case the time before writeover will, of course, be longer.

As indicated, the degree of shear can be important in that if too little shear is used, the fluid may not instantly harden as desired. In general, routine trial and experiment with any particular fluid will reveal the optimum requirement. It is a feature of the fast setting fluids of the invention that they can be solidified by applying a degree of shear easily available manually on a desk top. In general, the degree of shear will be from about 50 to about 10000 $s^{-1}$, for example about 2000 s.

The precise formulation of the fast setting correction fluids of the invention can vary depending on the nature of the components. In general, the solids content will usually be above 75% by weight and can be up to about 85% or more by weight. These fluids will normally give instant solidification and immediate writeover. As the solids content is reduced, and/or the content of particles of composite material of the invention is reduced, writeover time will increase. Routine trial and experiment in any particular case will indicate optimum conditions. The amount of opacifying particles will usually be between about 20% and 40%. The amount of composite material of the invention will usually be up to a maximum of about 50%, more preferably from 8 to 30%, and most preferably from 12 to 20%.

As indicated previously, the preferred way of making the fast setting correction fluids of the invention is by polymerizing in situ the irradiation-polymerisable liquid dispersed in an aqueous latex of a film-forming binder. In this method, some of the film-forming binder tends to be incorporated into the composite material particles formed as the polymerisable liquid polymerizes. This can result in a shortage of film-forming binder in the final product, so that the films formed therefrom tend to be brittle and flake from the paper when dry. This can be dealt with simply by mixing into the irradiated correction fluid some more (non-irradiated) film-forming binder. One way of doing this is to add a conventional (non-irradiated) correction fluid latex to the irradiated correction fluid of the invention. Thus, a correction fluid of the invention can be made from a conventional aqueous correction fluid by (a) dispersing the irradiation polymerisable liquid therein and polymerizing, and (b) mixing the irradiated product with further conventional (non-irradiated) aqueous correction fluid. The proportion of further (non-irradiated) fluid mixed with the product of step (a) can be as high as about 90:10, but will usually be from 50:50 to 70:30, most preferably about 60:40 by weight. It will be appreciated that, by this procedure, the original product of step (a) receives not only further film-former but also extra opacifying particles. This can result in greater covering power in use.

It has also been found that, when correction fluids have particles of composite material of the invention added to them, the shelf stability of the suspension can be greatly improved. In such cases, it can be unnecessary to shake a container even after storage for several months, in order to re-disperse the solids.

It is a feature of the present invention that, if desired, correction fluids with very high solids loadings, e.g., above 80%, can be made without associated high viscosity. Thus, the fluids do not become unwieldy pastes and/or unstable dispersions. The fluids remain as fluids and whilst they may become relatively viscous, e.g., 6000 Pa s, they are easily spreadable manually, under 50 sec$^{-1}$ shear for example, using a brush, giving a viscosity of about 300 Pa s. This very high solids loading without loss of stability, etc., is novel and constitutes a further aspect per se of the present invention.

In a further aspect, the invention provides a method of making a correction fluid of the invention which comprises the steps of:

(a) providing composite material particles of the invention; and (b) mixing with said material at least one compatible film forming latex material, and particles of at least one opacifier.

The invention also includes the use of composite material particles of the invention, or aqueous suspensions thereof, as a component of an aqueous correction fluid.

Further, the invention includes the use of composite material particles of the invention or of an aqueous suspension thereof, in forming a coating on a substrate.

The invention also provides a coating on a substrate, which coating comprises composite material particles of the invention, wherein the composite material particles are bound together in said coating by a compatible film-forming latex material.

BRIEF DESCRIPTION OF THE DRAWING

In order that the invention may be more fully understood, reference is made to the accompanying drawings wherein

FIG. 1 is a top plan view of a Latex II correction fluid dried film which is not in accordance with the invention;

FIG. 2 is a top plan view of a frozen and fractured mixture described in Example 1;

FIG. 3 is a top plan view of a frozen and fractured aqueous suspension of particulate material according to the present invention, as described in Example 1;

FIG. 4 is a top plan view of a dried film formed from an aqueous suspension of particulate material according to the present invention, as described in Example 1;

FIG. 5 is a top plan view of a film of a dried correction fluid of the invention as described in Example 2;

FIG. 7 is a chart of particle size distribution in Latex II (line A); in an aqueous suspension of particulate material according to the invention (line B), (Example 1); and in a correction fluid of the invention (line C); (Example 2);

FIGS. 8(a), 8(b) and 8(c) illustrate one embodiment of correction fluid applicator of the invention and its use.

DESCRIPTION OF THE PREFFERED EMBODIMENTS

Figure 1:
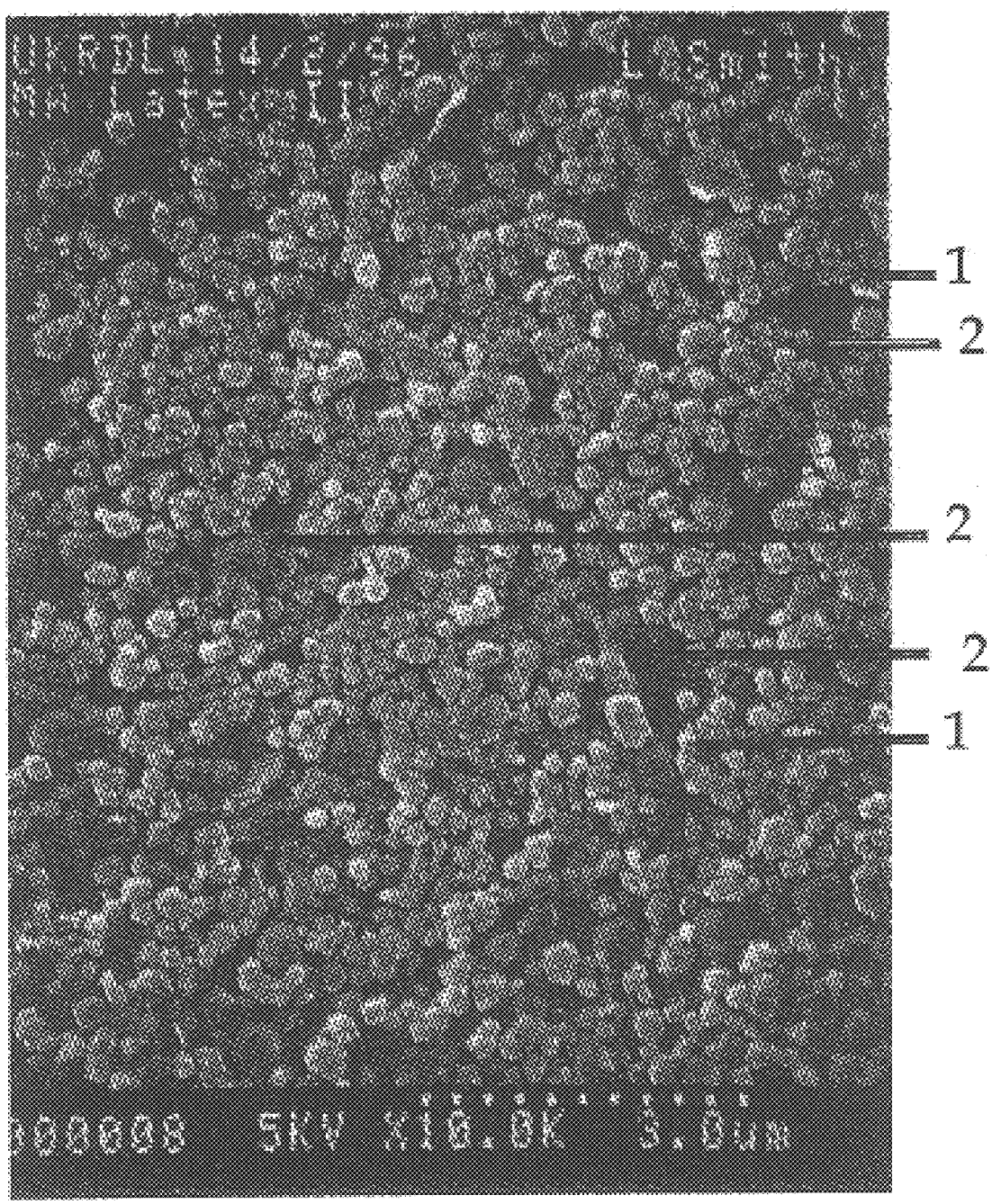
FIGS. 1 to 5 are SEM photographs, in which drawings.

Referring to the drawings, FIG. 7 shows particle size distributions in three fluids. The measurements were made on a Malvern Mastersizer instrument and the plots are of % volume of the solid product occupied by particles of a given diameter. Plot A is for Latex II which is a correction fluid which is not in accordance with the invention and whose composition is set out in Table I hereafter. As can be seen (and is confirmed by other work), most of the solids (the film-forming latex particles and the titanium dioxide particles) are in the size range 0.2 to 2.0 micrometers. In particular, the particle size and volume distribution are as follows:

| size range | volume % |
| --- | --- |
| 0.125–0.313 | 9.6 |
| 0.313–0.576 | 23.4 |
| 0.576–0.781 | 16.0 |
| 0.781–1.06 | 15.3 |
| 1.06–1.44 | 13.2 |
| 1.44–1.95 | 9.1 |
| 1.95–2.65 | 4.7 |
| 2.65–6.63 | 6.4 |
| 6.63–16.57 | 2.3 |
| | 100.0 |

It can be seen that over 91% by volume of the particles lie in the main peak area (i.e., up to 2.65 micrometers in diameter) and only a few (less than 9%) are in the second very minor peak area (i.e., greater than 2.65 micrometers). The particles in the second peak area are believed to be mainly film forming binder particles. Furthermore, the mode sizes of the particles in the two peaks are, respectively, about 0.75 and 5.7 micrometers.

Plot B is of an aqueous suspension of composite material (particles of the invention as made in Example 1 hereafter (i.e., an aqueous suspension which was an irradiated mixture of Hi-Tad and Latex II). As can be seen, plot B is markedly different from plot A in that plot B has a new second peak of particles ranging in size from about 3 to about 70 micrometers. This peak is of the composite material particles produced by the polymerization reaction and they comprise latex particles of film-forming binder fixed relative to each other by a matrix of polymerized Hi-Tad which also includes some filler opacifying particles (e.g., titanium dioxide). The particle size and volume distribution are as follows:

| size range | volume % |
| --- | --- |
| 0.05–0.092 | 2.8 |
| 0.092–0.170 | 6.9 |
| 0.170–0.313 | 10.1 |
| 0.313–0.576 | 9.9 |
| 0.576–1.06 | 7.8 |
| 1.06–2.65 | 8.1 |
| 2.65–3.60 | 1.6 |
| 3.60–9.00 | 6.8 |
| 9.00–16.57 | 16.3 |

-continued

| size range | volume % |
| --- | --- |
| 16.57–30.53 | 21.8 |
| 30.53–76.32 | 7.9 |
| | 100.0 |

It can be seen that the smaller size peak (up to 2.65 micrometers diameter particles) contains about 47% volume % of the particles and the larger size peak (above 2.65 micrometer diameter particles) contains about 53% volume % of the particles. Furthermore, the mode sizes of the particles in the two peaks are, respectively, about 0.3 and 20 micrometers. A bimodal size pattern of this general type is an important highly preferred feature of the invention, since it is believed to contribute to the achievement of very short writeover times. In particular, it enables the smaller size particles to occupy interstitial spaces between the larger particles, when the suspension is applied as a film on a substrate. This efficient close packing is also facilitated by the generally spherical nature of the composite particles and of the latex particles.

Plot C is of a correction fluid of the invention (see Example 2) formed by mixing the particulate suspension of plot B with Latex II (50:50). Comparing plots B and C, it can be seen that there is an increase in the size of the left-hand peak (indicating an increase in the amount of free film-forming binder particles and filler particles in the suspension), but the plot retains the bimodal features of plot B.

The particle size and volume distribution are as follows:

| size range | volume % |
| --- | --- |
| 0.05–0.230 | 7.7 |
| 0.230–0.424 | 13.1 |
| 0.424–0.781 | 17.7 |
| 0.781–1.44 | 15.1 |
| 1.44–2.65 | 7.9 |
| 2.65–3.60 | 2.0 |
| 3.60–9.00 | 7.2 |
| 9.00–12.21 | 4.2 |
| 12.21–22.49 | 11.1 |
| 22.49–56.23 | 12.5 |
| 56.23–76.32 | 1.5 |
| | 100.0 |

The left hand peak (up to about 3.60 micrometers diameter) contains about 63% by volume of the particles, and the right hand peak (from 3.6 micrometers upwards) contains about 37% by volume of the particles. The mode sizes of the particles in the two peaks are, respectively, about 0.3 and 20 micrometers.

Figure 8A:
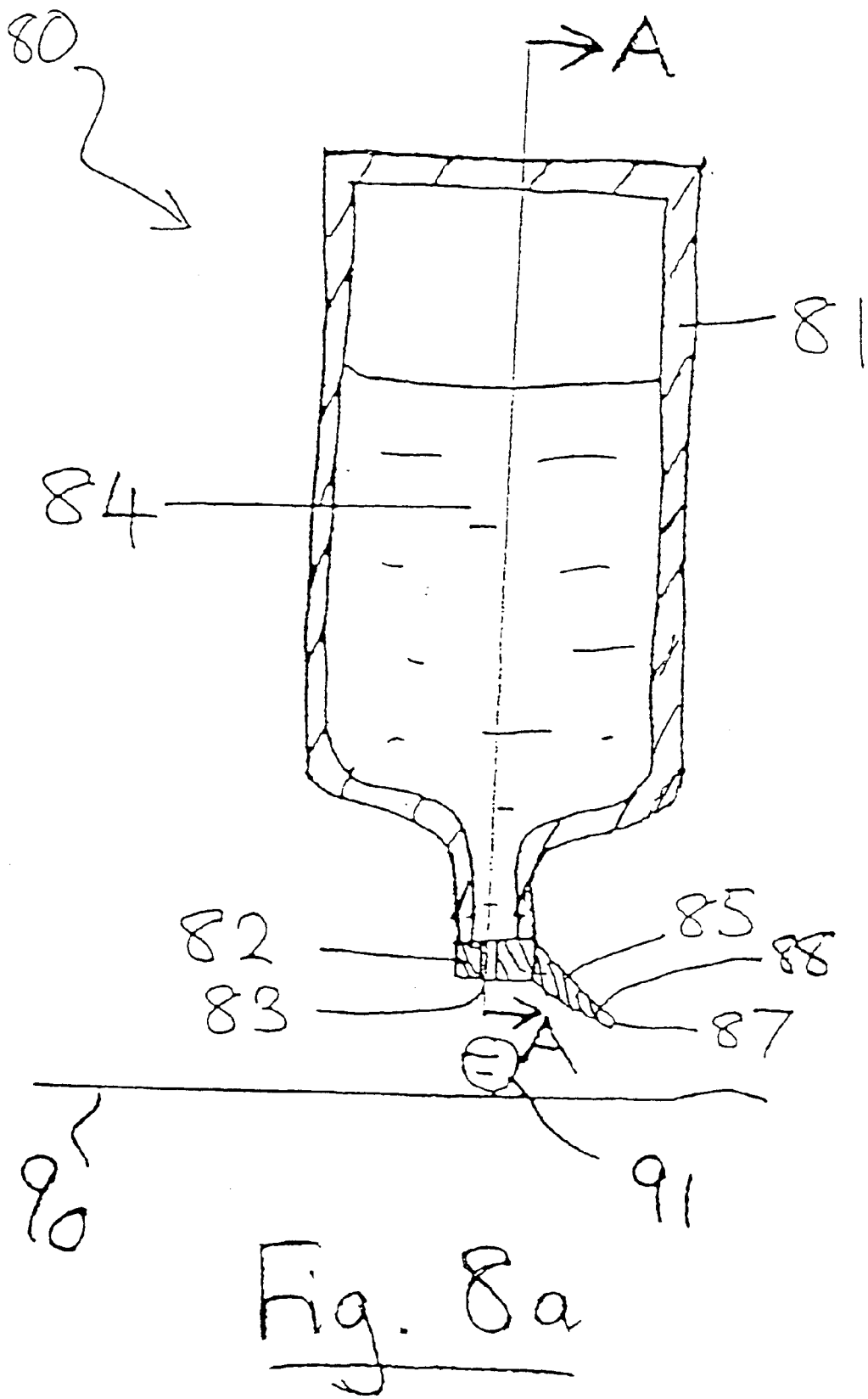

FIG. 8(a) is a schematic vertical sectional view of one embodiment of correction fluid applicator (80) according to the present invention. The applicator comprises a flexible bottle-like container (81) (shown inverted) with a cap (82) having an outlet passage (83) therethrough. A valve may be provided (not shown) to control the ingress of air and egress of correction fluid from the container (81). Within the container is a correction fluid (84) of the invention.

Externally of container (81) is a shear member (85) connected to cap (82). Shear member (85) is of plate-like shape and has two spaced feet (86) at its lower edge (87). Between the feet (86) is a recessed shear edge (88) (see FIG. 8(c)).

Figure 8C:
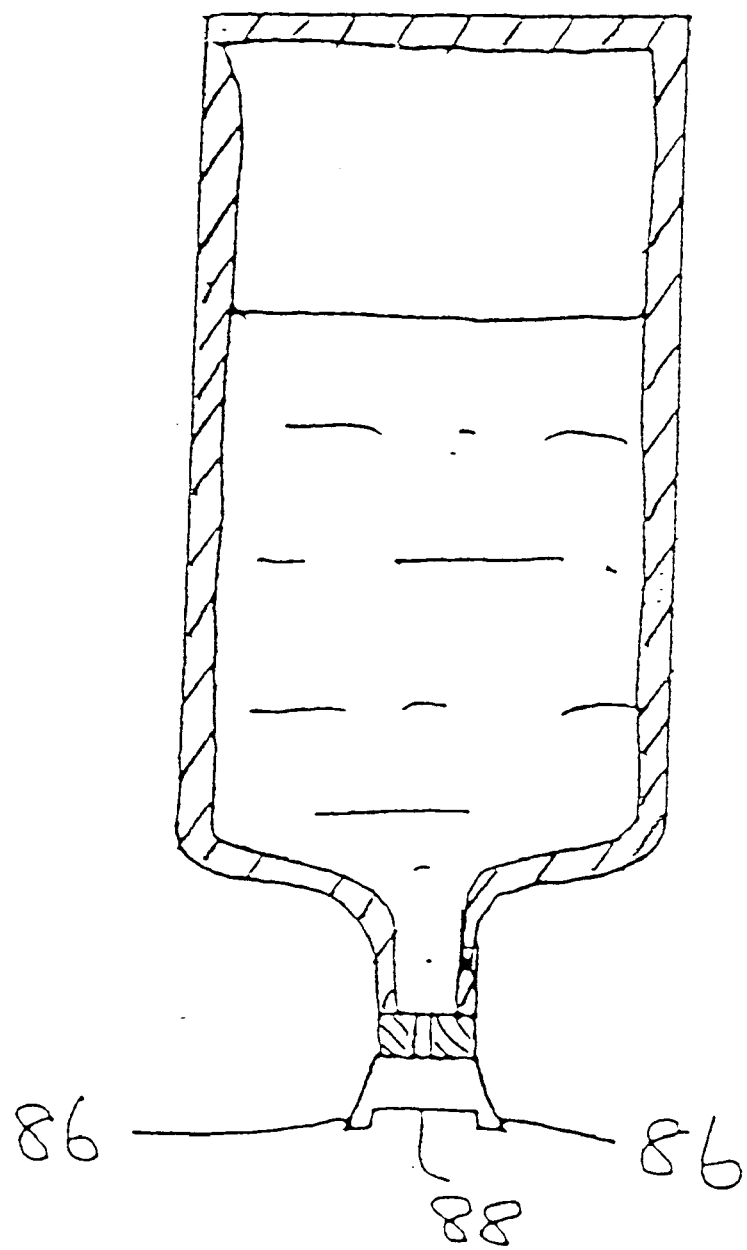

FIGS. 8(b) and 8(c) show the same applicator as FIG. 8(a), but in FIG. 8(c) the applicator is illustrated in the direction of section line A—A in FIG. 8(a).

In use, the applicator (80) is disposed over a substrate (90), e.g., a sheet of paper. A drop (91) or larger quantity of correction fluid is dispensed on to the substrate (90) by squeezing the flexible container (81)—FIG. 8(a). The applicator is then tilted to bring shear member (85) behind the drop (91). The applicator is moved to the left (FIG. 8(b)—see arrow B) with the applicator feet (86) bearing on the substrate (90). The fluid drop (91) is thus spread as a thin film (92) by the shear edge (88) of the shear member (85). During the spreading, the shear edge (88) subjects the fluid to edge shear.

FIGS. 1 to 6 are SEM photographs. FIG. 1 shows the surface of a film formed of the aqueous correction fluid herein called Latex II which is not in accordance with the invention and whose constitution is given in Table I. The film was formed by placing a drop of the correction fluid on paper and then spreading it with a 50 micrometer Bird bar. The film includes titanium dioxide particles (1) and film-forming binder particles (2). The film is opaque and can be flexed without cracking.

FIGS. 2 to 6 will be described in relation to Examples 1 and 2 below.

In the Examples, writeover times were determined as follows. Using a ballpoint pen, handwriting was produced on a paper sheet. Correction fluid was applied to the handwriting and the time noted. After a measured interval, a writeover correction was made on the correction fluid film by ballpoint pen handwriting. If the writeover was not accepted, the test was repeated at longer intervals until writeover was accepted. By "accepted", we mean that the handwriting should make a mark without ploughing or fracturing the surface of the correction fluid film. The shortest interval at which writeover was accepted was noted as the writeover time. The ballpoint pen used was a Papermate Flexgrip Ultra Medium, but other ballpoint pens can be used.

The following Examples are given by way of illustration only. Parts are by weight unless indicated otherwise.

EXAMPLE 1

Figure 2:
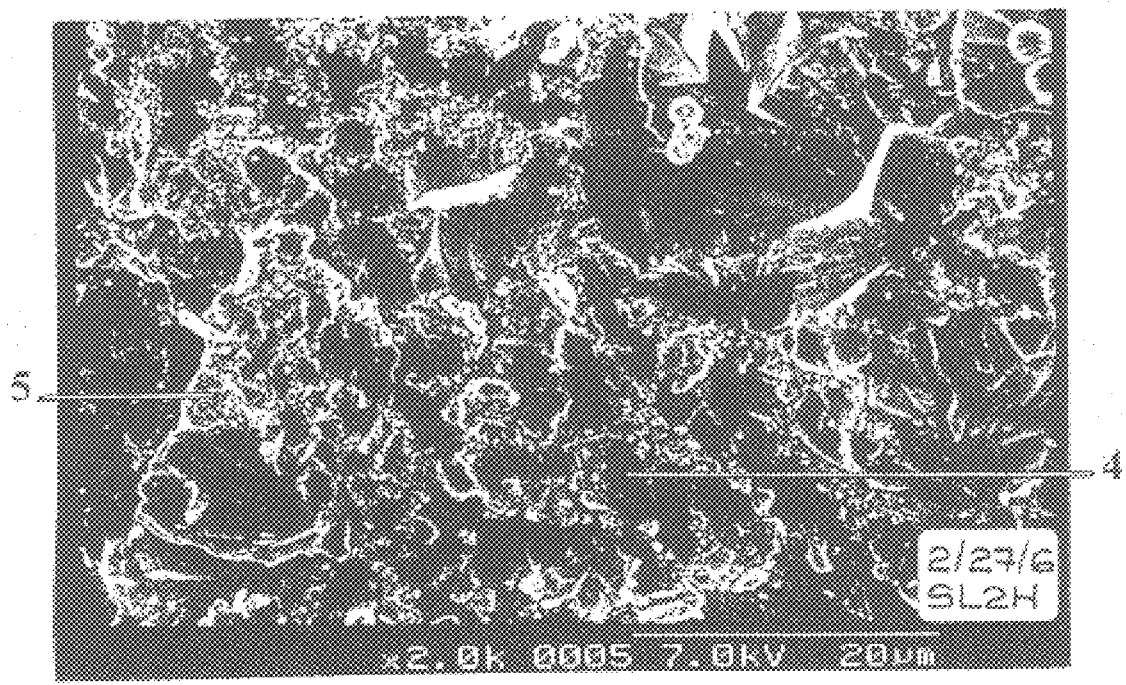

Hi-Tad liquid monomer (40 parts) was placed in a vessel, and Latex II (60 parts) added thereto. The two components were then vigorously mixed using a Dispermat mixer. A sample of the mixture so formed was frozen and fractured and subjected to SEM as shown in FIG. 2 of the accompanying drawings. It is clear from FIG. 2 that the Hi-Tad monomer is not present as sphencal globules dispersed in the aqueous phase. Rather, the Hi-Tad is present in discrete volumes (4) of a laminar or pancake-like shape. These volumes (4) are surrounded by the aqueous suspension (5) containing film-forming binder particles and titanium dioxide particles.

Figure 3:
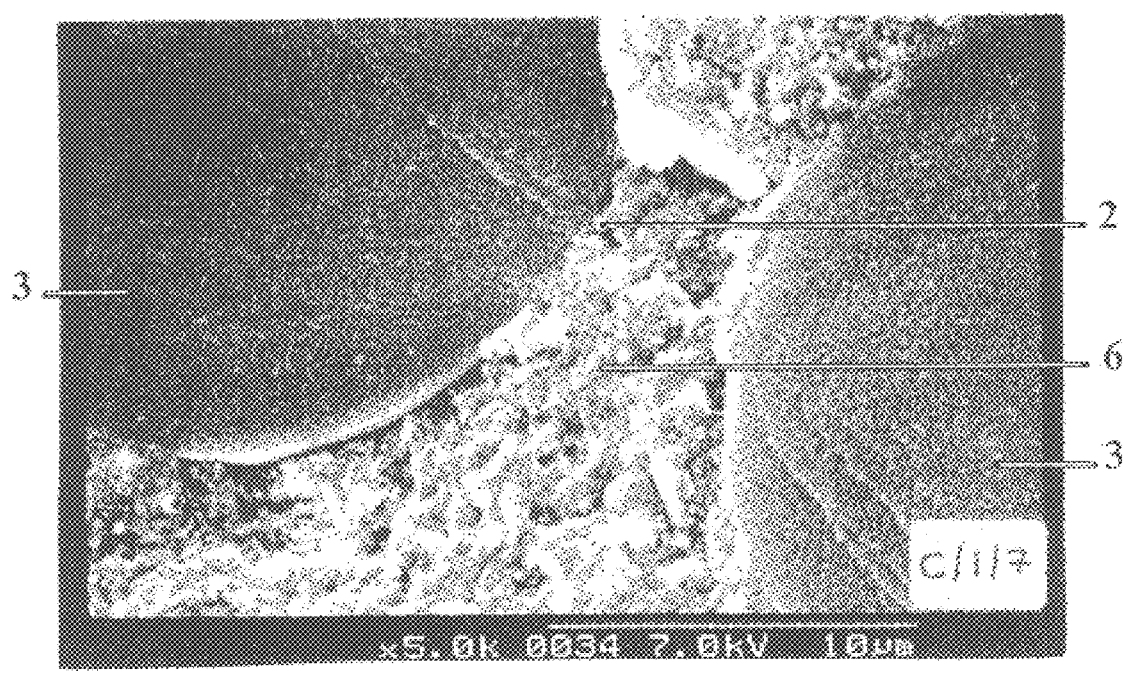

Samples of the liquid mixture were sealed in polyethylene tubes and subjected to a total electron beam irradiation of 2 MRad (in 1 MRad increments at room temperature). The resulting fluid which was an aqueous suspension containing composite material particles of the invention, was very viscous (above 50000 mPa s) but was stable in that the solids did not settle out. A sample of the fluid was frozen and fractured and subjected to SEM as shown in FIG. 3 of the accompanying drawings. FIG. 3 shows parts of two composite particles (3) which have been formed by the polymerization. These composite particles have film-forming binder particles at their surface. Between the composite particles (3) is the aqueous phase (6) containing some film-forming binder particles (2) and some titanium dioxide particles.

Figure 6:
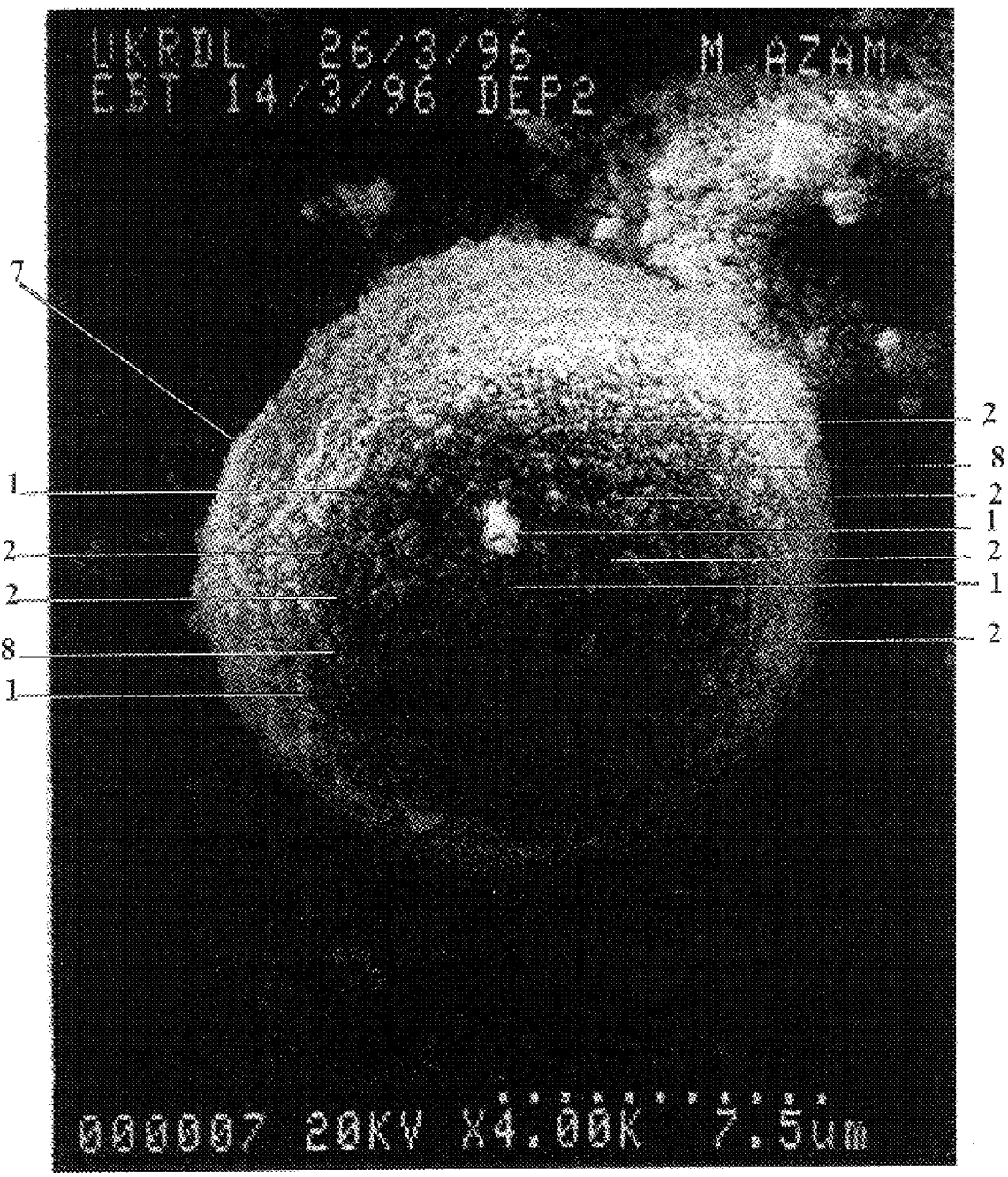
FIG. 6 is a view of a composite particle formed in the process of the invention by the polymerization of Hi-Tad (Example 1)

FIG. 6 shows, on a larger scale, a composite particle after separation from the fluid. The composite material particle includes film-forming binder particles (2) bound together by, and thus fixed relative to each other by, a matrix (8) of Hi-Tad polymer, the matrix also including titanium dioxide particles (1). The whole composite material particle will normally have a diameter of from 50 to 100 times that of the film-forming binder particles (2). The film-forming binder particles (2) are present within the composite particle and adjacent its surface (7). The particles of film-forming binder (2) and the opacifying particles are very close, and adjacent particles can be touching and thus bound to one another. The matrix (8) of irradiation polymerized polymer fills the interstices between the particles.

Figure 4:
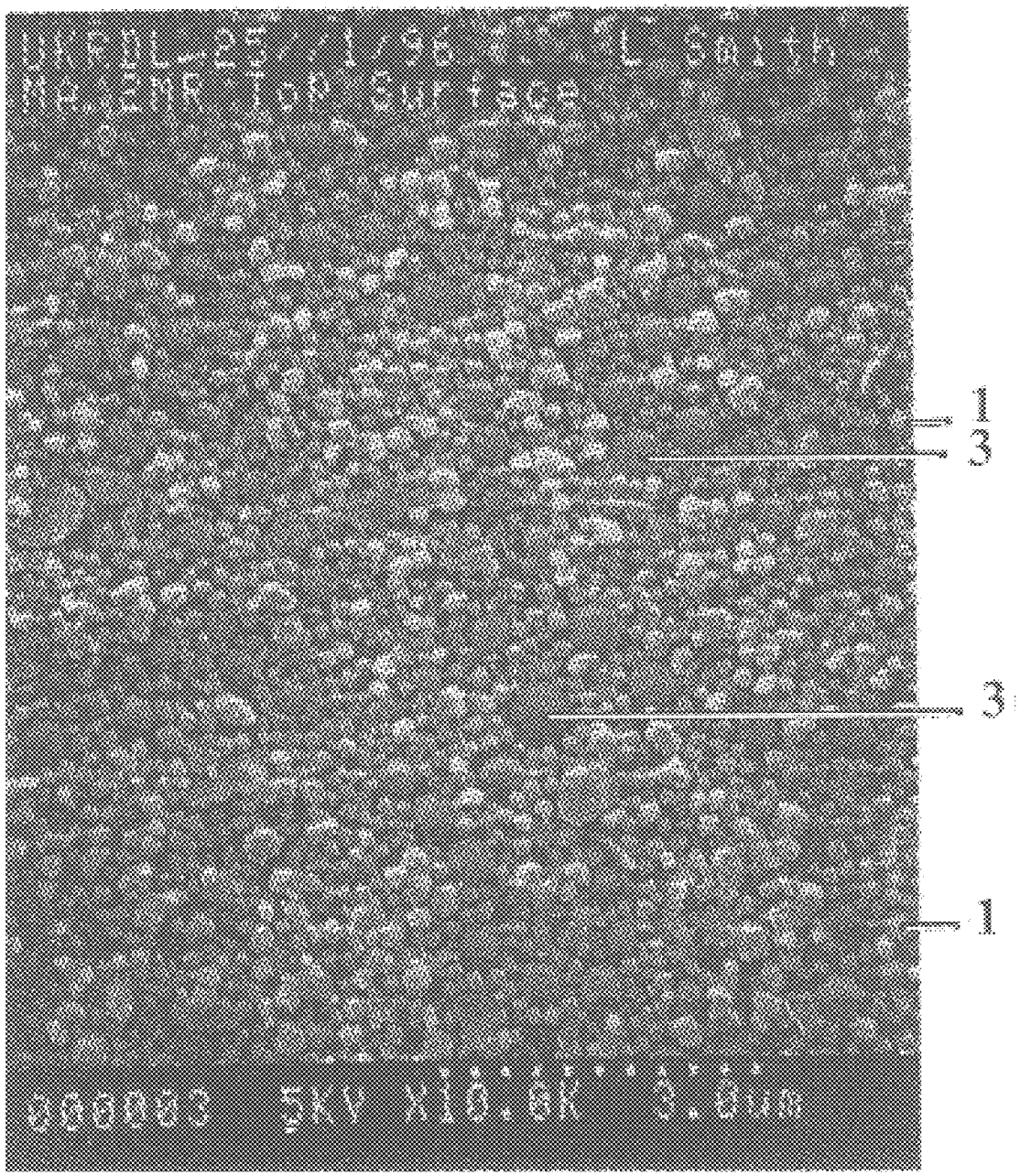

After irradiation, a drop of the fluid was removed from the tube onto paper and spread using a 50 micrometer Bird bar. The fluid immediately formed a smooth relatively solid (dimensionally stabilized) opaque coating on the paper. The coating was dry to the touch and could be written over immediately. However, the coating had little coherence and was crumbly and easily removed from the paper. A sample of the coating was examined under an SEM and photographed (FIG. 4). Referring to FIG. 4, the film surface comprises composite particles (3) of the invention, and titanium dioxide particles (1). There are very few free film-forming binder particles.

The constitution and properties of the Latex II and of the irradiated mixture were as in Table I:

TABLE I

| Ingredient (solid %) | | LATEX II (weight %) | Example 1 Irradiated mixture of Latex II/Hi-Tad 60/40 (weight %) |
|---|---|---|---|
| Water | | 15.60 | 9.36 |
| Ti PURE R900 (100%) | (1) | 47.48 | 28.49 |
| NYAD 400 (100%) | (2) | 3.75 | 2.25 |
| Kaopaque 10S | (3) | 5.00 | 3.00 |
| UCAR 466 (62%) | (4) | 11.34 | 6.80 |
| UCAR 144 (48%) | (5) | 14.64 | 8.78 |
| Nopcosperse 44 (35%) | (6) | 1.07 | 0.64 |
| Nopco 8034 (35%) | (7) | 0.21 | 0.13 |
| Magnet Black (100%) | (8) | 0.12 | 0.07 |
| Rhoplex PR-26 | (9) | 0.81 | 0.49 |
| Hi-Tad | (10) | — | 40.00 |
| Hi-Tad/Binder | | — | 4.74:1 |
| Pigment/Binder | | 4/1 | 4/1 |
| Total Solids | | 71% | 83% |
| Writeover Time | | 18 sec | immediate |
| Viscosity (mPa s) at 50 s$^{-1}$ | | 76 | >50,000 |

(1) Titanium dioxide from DuPont, Wilmington, Delaware contains 94% titanium dioxide and about 4.5% alumina Particle size 90% <0.6 micrometers, 80% <0.4 micrometers.
(2) Calcium metasilicate acicular particles from NYCO Minerals Inc., Willsbro, NY.
(3) Extender pigment containing over 97% kaolin clay and 0.35% sodium polyacrylate/soda ash dispersant. From Dry Branch Kaolin Co., Dry Branch, GA.
(4) Synthetic acrylate/styrene polymer latex emulsion (62% solids) of methyl methacrylate, butyl acrylate, styrene, methacrylic acid and 2-hydroxyethyl acrylate. Tg = 9° C. from Union Carbide, Cary, NC.
(5) Synthetic acrylate/styrene polymer latex emulsion (48% solids) of butylacrylate, styrene and methacrylic acid. From Union Carbide, Cary, NC.
(6) Sodium salt of carboxylate polyelectrolyte from Henkel Corp., Ambler, PA.
(7) Mixture of mineral oil derivatives and silica defoaming agent from Henkel Corp., Ambler, PA.
(8) Carbon black.
(9) Cationic non-film forming acrylic polymer antibleed agent. From Rohm & Haas, PA.
(10) Bisphenol A propyl dimethacrylate.

EXAMPLE 2

Figure 5:
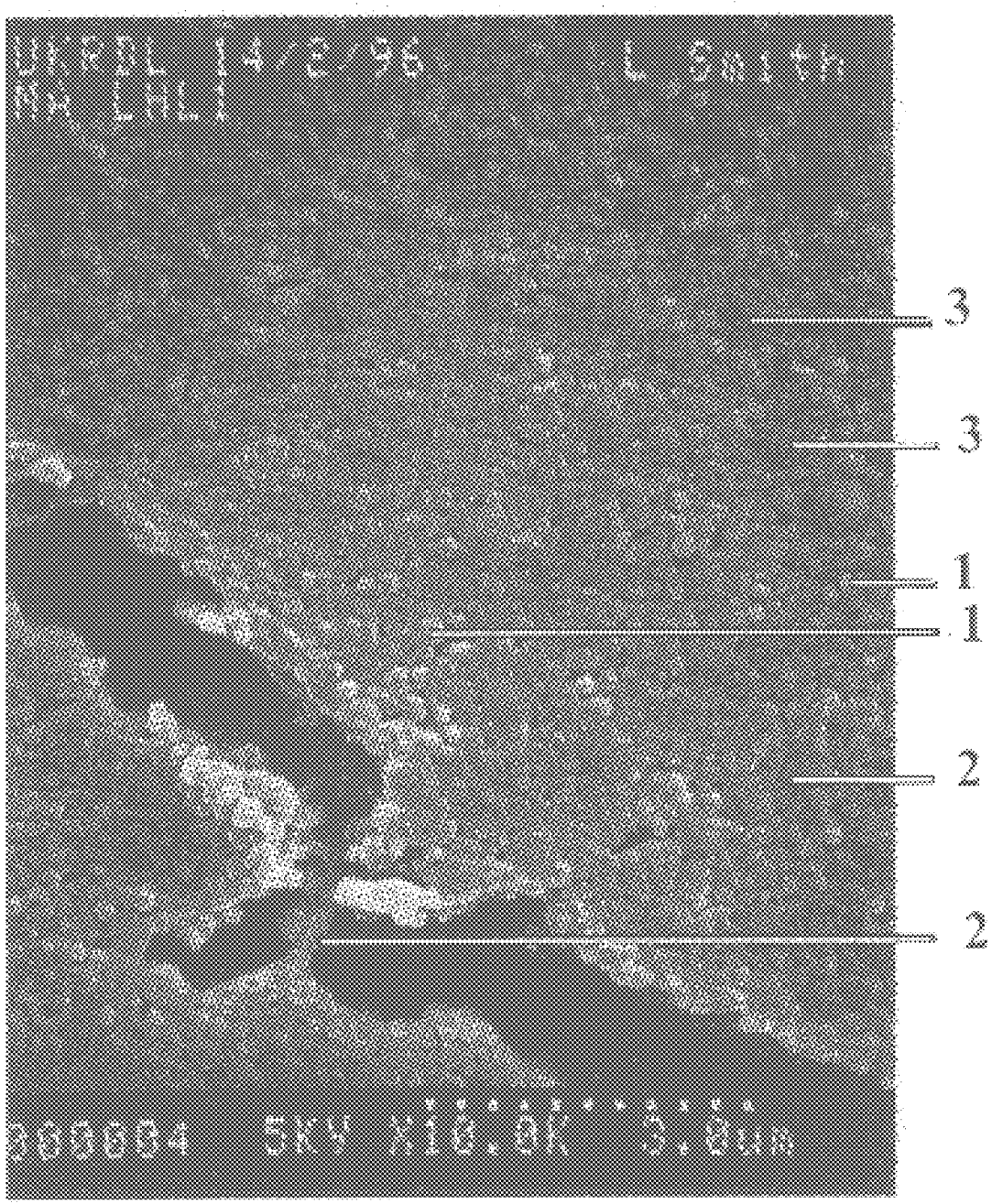

The irradiated fluid of Example 1 (50 parts) was mixed with a compatible film-forming latex fluid such as Latex II (50 parts) and a drop of the resulting correction fluid mixture was applied to paper. Upon spreading the correction fluid with a 50 micrometer Bird bar, it immediately set to form a dimensionally stabilized relatively solid film on the paper. The film had excellent opacity and good flexibility, and could accept writeover immediately. A sample was examined under an SEM and photographed (FIG. 5). FIG. 5 shows the surface of a film formed from a correction fluid of the invention. The significantly larger particles (3) are the composite material particles formed by the polymerization. These composite material particles and the titanium dioxide particles (1) are bound together by the film-forming binder particles (2). The even distribution of particles is evident as is the close packing.

We have found that, in the correction fluids of the invention, the composite particles, the opacifier and the film-forming binder particles are extremely well dispersed This is evidenced by the fact that, even when subjected to very high shear (200,000s$^{-1}$), surprisingly they do not form the expected Hofman bodies from breakdown of the dispersion. Because the particles are well dispersed and because there is a bimodal size distribution and the composite particles and film-forming binder particles are generally spherical, the effect of shear from the Bird bar (about 2000 s$^{-1}$) is to cause the particles to close pack efficiently which then results in coalescence of adjacent film-forming particles (both free and on the surfaces of composite particles) to form a quickly set relatively solid film.

The constitution and properties of the correction fluid were as shown in Table II:

TABLE II

| Ingredient (solid %) | Example 2 Irradiated Latex II/Hi-Tad (60:40) and Latex II in weight ratio (50:50) (weight %) |
|---|---|
| Water | 12.48 |
| Ti PURE R900 (100%) | 37.99 |
| NYAD 400 (100%) | 3.00 |
| Kaopaque 10S | 4.00 |
| UCAR 466 (62%) | 9.07 |
| UCAR 144 (48%) | 11.71 |
| Nopcosperse 44 (35%) | 0.85 |
| Water | 12.48 |
| Nopco 8034 (35%) | 0.17 |
| Magnet Black (100%) | 0.10 |
| Rhoplex PR-26 | 0.68 |
| Hi-Tad | 20.00 |
| Hi-Tad/Binder | 1.8:1 |
| Pigment/Binder | 4/1 |
| Total Solid | 77.3% |
| Writeover Time (sec) | 8 sec |
| Viscosity at 50 s$^{-1}$ (mPa s) | 364 |

EXAMPLE 3 TO 6

Example 1 was repeated but using different proportions of Latex II and Hi-Tad monomer. At 50:50 (Example 3), the irradiated product was solid. At 52:48 (Latex: Hi-Tad) (Example 4), the product was a fluid having properties very similar to those of the irradiated product of Example 1. With increasing proportions of Latex II the resulting fluid was less viscous and could be spread more readily, but still stabilized dimensionally (solidified) immediately on being subjected to shear. Over about 70:30 (Example 5), the writeover time began to rise.

The constitution and properties of the formulations were as shown in Table III:

TABLE III

Irradiated Latex II/Hi-Tad in weight ratios:

| Ingredient (solid %) | Example 3 50:50 (weight %) | Example 4 52:48 (weight %) | Example 5 70:30 (weight %) | Example 6 80:20 (weight %) |
|---|---|---|---|---|
| Water | 7.80 | 8.11 | 10.92 | 12.48 |
| Ti PURE R900 (100%) | 23.74 | 24.69 | 33.23 | 37.98 |
| NYAD 400 (100%) | 1.875 | 1.95 | 2.62 | 3.00 |
| Kaopaque IOS | 2.50 | 2.60 | 3.50 | 4.00 |
| UCAR 446 (62%) | 5.67 | 5.89 | 7.94 | 9.07 |
| UCAR 144 (48%) | 7.32 | 7.61 | 10.25 | 11.71 |
| Nopcosperse 44 (35%) | 0.535 | 0.556 | 0.75 | 0.856 |
| Nopco 8034 (35%) | 0.105 | 0.109 | 0.15 | 0.168 |
| Magnet Black (100%) | 0.06 | 0.062 | 0.084 | 0.096 |
| Rhoplex PR-26 | 0.405 | 0.421 | 0.567 | 0.648 |
| Hi-Tad | 50 | 48 | 30 | 20 |
| Hi-Tad/Binder | 7.1:1 | 6.6:1 | 3:1 | 1.8:1 |
| Pigment/Binder | 4/1 | 4/1 | 4/1 | 4/1 |
| Total Solid | 85.5% | 85.3% | 80.1% | 77.3% |
| Writeover Time | solid stick | immediate | immediate | 5–10 sec |
| Viscosity (mPa s) | solid stick | >50,000 | — | — |

EXAMPLES 7 TO 10

Example 2 was repeated using various proportions of irradiated fluid and Latex II. Satisfactory correction fluids were obtained with increasing amounts of Latex II up to proportions of about 80:20 (Latex II: irradiated fluid) (Example 9). With increasing amounts of Latex II, whilst the fluids dimensionally stabilized sufficiently to apparently set to a solid on the application of shear, the material tended to be softer and to require a few seconds before accepting writeover. The constitution and properties of the formulations were as shown in Table IV.

In these Examples, it was found that with increasing proportions of Latex II, films spread using a Bird bar became of reduced thickness so that, although the films could be overwritten very quickly, their opacity was poorer. It was therefore impossible to make a fair comparison of writeover time versus composition. Accordingly, the data in the Table for writeover time were determined by a different technique. The correction fluid was applied over a mark on a test sheet using a brush until the mark had been satisfactorily covered, and then the time was measured until the correction could be successfully overwritten. For comparison, the writeover time measured in this way for Latex II was 26 seconds. The viscosity of Latex II at 50 s$^{-1}$ was 52 mPa s.

TABLE IV

Latex II and irradiated Latex II/Hi-Tad (60:40) in weight ratio:

| Ingredient (solid %) | Example 2 50:50 | Example 7 60:40 | Example 8 70:30 | Example 9 80:20 | Example 10 90:10 |
|---|---|---|---|---|---|
| Water | 12.48 | 13.10 | 13.73 | 14.35 | 14.97 |
| Ti PURE R900 (100%) | 37.99 | 39.88 | 41.78 | 43.68 | 45.48 |
| NYAD 400 (100%) | 3.00 | 3.15 | 3.30 | 3.45 | 3.60 |
| Kaopaque IOS | 4.00 | 4.20 | 4.40 | 4.60 | 4.80 |
| UCAR 446 (62%) | 9.07 | 9.52 | 9.98 | 10.43 | 10.88 |
| UCAR 144 (48%) | 11.71 | 12.29 | 12.88 | 13.47 | 14.05 |
| Nopcosperse 44 (35%) | 0.85 | 0.90 | 0.94 | 0.98 | 1.03 |
| Nopco 8034 (35%) | 0.17 | 0.18 | 0.18 | 0.19 | 0.20 |
| Magnet Black (100%) | 0.10 | 0.10 | 0.10 | 0.11 | 0.11 |
| Rhoplex PR-26 | 0.68 | 0.68 | 0.71 | 0.74 | 0.78 |
| Hi-Tad | 20 | 16 | 12 | 8 | 4 |
| Hi-Tad/Binder | 1.8/1 | 1.4/1 | 1.0/1 | .06/1 | 0.3/1 |
| Pigment/Binder | 4/1 | 4/1 | 4/1 | 4/1 | 4/1 |
| Total Solid | 77.3 | 76.2 | 75.0 | 73.9 | 72.8 |
| Writeover Time (sec) | 6 | 8 | 14 | 16 | 20 |
| Viscosity at 50 s$^{-1}$ (mPa s) | 364 | 249 | 168 | 141 | 101 |

EXAMPLE 11 AND 12

Example 1 was repeated using Latex A instead of Latex II. Latex A is a non-bleed correction fluid. The results obtained were essentially the same as in Example 1. Thus, the irradiated product was a very viscous (>50,000 mPa s) but stable fluid. When a quantity of the fluid was spread using a 50 micrometer Bird bar, the fluid was immediately converted to a smooth dimensionally stabilized solid opaque coating which could be written over immediately. A sample of the fluid was then mixed with further Latex A in weight proportions of 50:50 (Example 11). The resulting fluid could be spread with a 50 micrometer Bird bar to form immediately a dimensionally stabilized solid opaque film. The film accepted writeover immediately.

The constitution and properties of Latex A and the formulations thereof were as shown in Table V.

TABLE V

| Ingredient (Solid %) | | Latex A wt % | Example 11 Irradiated Latex A:Hi-Tad 70:30 | Example 12 Latex A and irradiated Latex A:Hi-Tad (70:30) in wt ratio 90:10 |
|---|---|---|---|---|
| Water | | 8.47 | 5.92 | 6.18 |
| Hipochem CGB | (1) | 1.08 | 0.75 | 0.79 |
| Worlecryl 8721 (30%) | (2) | 34.42 | 24.09 | 25.12 |
| Ti Pure R931 | (3) | 37.16 | 26.01 | 27.13 |
| Ti Pure R902 | (4) | 12.39 | 8.68 | 9.05 |
| VINAC XX210 (55%) | (5) | 6.26 | 4.38 | 4.57 |
| Nopco 8034 | (6) | 0.20 | 0.14 | 0.15 |
| Harshaw Black | (7) | 0.02 | 0.01 | 0.01 |

TABLE V-continued

| Ingredient (Solid %) | Latex A wt % | Example 11 Irradiated Latex A:Hi-Tad 70:30 | Example 12 Latex A and irradiated Latex A:Hi-Tad (70:30) in wt ratio 90:10 |
|---|---|---|---|
| Hi-Tad (8) | — | 30.00 | 27.00 |
| Hi-Tad/Binder | N/A | 3.1/1 | 2.7/1 |
| Pigment/Binder | 3.6/1 | 3.6/1 | 3.6/1 |
| Total Solids | 64.6% | 75.2% | 74.2% |
| Writeover Time (sec) | 36 | 4 | 14 |

(1) Fatty quaternary dispersant from High Point Chemical Corp., High Point, NC, USA.
(2) From Worlee Chemie GmbH, Hamburg, Germany
(3) Titanium dioxide from DuPont, Wilmington, Delaware, U.S.A.
(4) Titanium dioxide from DuPont, Wilmington, Delaware, U.S.A.
(5) Vinyl acetate homopolymer emulsion.
(6) Mineral oil mixed with amorphous silica, defoaming agent from Henkel Corp., Ambler, PA.
(7) Aurasperse carbon black W-107 from Engelhard Corp., Iselin, New Jersey.
(8) Bisphenol A propyl dimethacrylate.

EXAMPLE 13

Latex II (60 parts) was placed in a vessel and Hi-Tad monomer (40 parts) was slowly added thereto with gentle mixing using a Dispermat mixer. After addition was complete the resulting mixture was vigorously mixed using the Dispermat. Samples of the liquid mixture were sealed in polyethylene tubes and subjected to electron beam irradiation of 2 MRad at room temperature. The resulting viscous fluid behaved similarly to Example 1. When a drop of the fluid was placed onto paper and spread using a 50 micrometer Bird bar, the fluid immediately formed a smooth dimensionally stabilized solid opaque coating on the paper. The coating was dry to the touch and could be written over immediately. However, the coating had little coherence and was crumbly and easily removed from the paper. When the fluid was diluted with an equal weight of Latex II, there resulted a fluid with comparable performance to that of Example 2. When a drop of the resulting fluid was applied to paper and spread with a 50 micrometer Bird bar, it immediately set to form a solid film on the paper. The film had excellent opacity and good flexibility, and could accept writeover immediately.

What is claimed is:

1. A material for use in a fluid, said material comprising:
   a plurality of film-forming binder particles; and
   a polymerized polymeric material containing a portion of said film-forming binder particles;
   said portion of said binder particles in combination with said polymerized polymeric material forming composite material particles;
   said composite material particles when polymerized, fixing said binder particles contained within said composite material particles relative to each other, said composite material particles having a substantially spherical outer surface and a diameter of from about 0.1 to about 100 micrometers, and a portion of said binder particles being bound adjacent the outer surface of said composite material particles.

2. A material according to claim 1, wherein each composite material particle additionally includes at least one opacifying particle fixed relative to the film-forming binder particles by the polymerized polymeric material.

3. A material according to claim 1, wherein the polymerized polymeric material comprises polyacrylates or polymethacrylates.

4. A material according to claim 3, wherein said polymeric material is derived from a polymer selected from the group consisting of bisphenol A propyl dimethacrylate, ethylene glycol dimethacrylate, triethylene glycol dimethacrylate and tetraethylene glycol dimethacrylate.

5. A material according to claim 1, wherein the film-forming binder particles comprise a water-insoluble polymer selected from the group consisting of vinyl alcohol copolymers, acrylic polymers, styrene copolymers, polyurethanes and ethylene vinyl acetate copolymers.

6. A material according to claim 1, which contains particles of at least two different film-forming binders.

7. A material according to claim 1, which contains particles comprising a film-forming binder having a glass transition temperature below 12° C.

8. An aqueous suspension for use in an aqueous correction fluid which suspension comprises
   (a) a material as claimed in claim 1; and
   (b) an aqueous suspending medium.

9. An aqueous correction fluid which comprises:
   (a) an aqueous latex comprising particles comprising a film-forming binder suspended in an aqueous medium;
   (b) opacifying particles suspended in said aqueous medium; and
   (c) material as claimed in claim 1 suspended in said aqueous medium.

10. A correction fluid according to claim 9, wherein the film-forming binder particles in said aqueous latex are the same as the film-forming binder particles in said material.

11. A correction fluid according to claim 9, which has a total solids content of at least 75% by weight.

12. A correction fluid according to claim 9, which contains from 10 to 50% by weight of said material.

13. A correction fluid according to claim 9, which contains at least 20% by weight of said opacifying particles.

14. A correction fluid according to claim 9, wherein the writeover time of said correction fluid is less than 30 seconds.

15. A correction fluid according to claim 14, wherein the writeover time of said correction fluid is less than 15 seconds.

16. A coating on a substrate, which coating comprises a material as claimed in claim 1, wherein the composite material particles are bound together in said coating by a compatible film-forming latex material.

17. A coating according to claim 16, which covers at least one mark on the surface.

18. An aqueous correction fluid comprising
   water,
   an opacifying agent, and
   composite particles including film-forming binder particles and a polymeric material containing said film-forming binding particles.

19. The correction fluid of claim 18, wherein said composite particles promote easy close packing in films composed of the correction fluid.

20. The correction fluid of claim 19, wherein said composite particles are substantially spherical in shape.

21. The correction fluid of claim 18, wherein said composite particles have an average diameter of less than 50 micrometers.

* * * * *